(12) United States Patent
Yamakaji et al.

(10) Patent No.: US 12,009,734 B2
(45) Date of Patent: Jun. 11, 2024

(54) POWER CONVERSION DEVICE AND AIR CONDITIONER

(71) Applicant: Mitsubishi Electric Corporation, Tokyo (JP)

(72) Inventors: Yusuke Yamakaji, Tokyo (JP); Ikuro Suga, Tokyo (JP); Satoru Ichiki, Tokyo (JP); Koichi Arisawa, Tokyo (JP); Tatsuya Yamanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 97 days.

(21) Appl. No.: 17/913,871

(22) PCT Filed: Apr. 20, 2020

(86) PCT No.: PCT/JP2020/017057
§ 371 (c)(1),
(2) Date: Sep. 23, 2022

(87) PCT Pub. No.: WO2021/214831
PCT Pub. Date: Oct. 28, 2021

(65) Prior Publication Data
US 2023/0344330 A1    Oct. 26, 2023

(51) Int. Cl.
*H02M 7/537* (2006.01)
*H02M 1/00* (2006.01)
*H02M 7/5387* (2007.01)

(52) U.S. Cl.
CPC ....... *H02M 1/0064* (2021.05); *H02M 1/0012* (2021.05); *H02M 7/53871* (2013.01)

(58) Field of Classification Search
CPC ............. H02M 1/0064; H02M 1/0012; H02M 7/53871; H02M 1/0003; H02M 7/5387; H02M 7/537
See application file for complete search history.

(56) References Cited

U.S. PATENT DOCUMENTS

2017/0077801 A1*  3/2017  Yanagimoto ............ H02P 27/06
2018/0006549 A1*  1/2018  Torii ....................... H02M 1/14
(Continued)

FOREIGN PATENT DOCUMENTS

| EP | 2278694 A1 | 1/2011 |
| JP | 2003-299386 A | 10/2003 |
| JP | 2009-250521 A | 10/2009 |

OTHER PUBLICATIONS

International Search Report and Written Opinion dated Jul. 14, 2020, received for PCT Application PCT/JP2020/017057, filed on Apr. 20, 2020, 9 pages including English Translation.

(Continued)

*Primary Examiner* — Adolf D Berhane
(74) *Attorney, Agent, or Firm* — XSENSUS LLP

(57) ABSTRACT

A noise propagating to outside of a power conversion device is reduced. A power conversion device includes at least one external electrode, a switching element, a noise filter connected between at least one external electrode and switching element, at least one first wire to connect at least one external electrode and noise filter, a second wire to connect noise filter and switching element, and a magnetic filter attached to second wire. An attenuation characteristic A [dB] and an attenuation characteristic B [dB] satisfy a relationship of B<A, where A is an attenuation characteristic of noise filter, and B is an attenuation characteristic due to spatial coupling between at least one first wire and second wire that is located between switching element and magnetic filter.

20 Claims, 41 Drawing Sheets

(56) References Cited

U.S. PATENT DOCUMENTS

2023/0179085 A1\* 6/2023 Furusho ................ H02M 1/126
             363/39
2023/0335326 A1\* 10/2023 Akita .................... H02M 1/126

OTHER PUBLICATIONS

Extended European Search Report dated May 2, 2023 in European Patent Application No. 20931798.1, 9 pages.
Office Action issued Dec. 1, 2023 in European Patent Application No. 20 931 798.1, 6 pages.

\* cited by examiner

POWER CONVERSION DEVICE AND AIR CONDITIONER

CROSS-REFERENCE TO RELATED APPLICATION

The present application is based on PCT filing PCT/JP2020/017057, filed Apr. 20, 2020, the entire contents of which is incorporated herein by reference.

TECHNICAL FIELD

The present disclosure relates to a power conversion device and an air conditioner.

BACKGROUND ART

Japanese Patent Laying-Open No. 2009-250521 (PTL 1) discloses a power conversion device, in which when a switching element of an inverter and an inductor are disposed at positions separated from each other, the switching element and the inductor are connected by a cable. At that time, as a countermeasure against noise of the inverter, a ferrite core is attached to the cable in order to suppress noise propagating through the cable.

CITATION LIST

Patent Literature

PTL 1: Japanese Patent Laying-Open No. 2009-250521

SUMMARY OF INVENTION

Technical Problem

However, in the power conversion device disclosed in PTL 1, electromagnetic noise (hereinafter, also referred to as "noise") caused by a switching power supply constituting the power conversion device is propagated to outside of the power conversion device through a noise filter provided in the power conversion device, and a path is also generated in which the electromagnetic noise is propagated to the outside of the power conversion device through a space. As a result, when a noise filter designed to achieve a desired attenuation characteristic is incorporated in the power conversion device, there is a problem that the desired attenuation characteristic is deteriorated.

The present disclosure has been made to solve the above problem, and an object of the present disclosure is to reduce a noise propagating to outside of a power conversion device.

Solution to Problem

A power conversion device of the present disclosure includes at least one external electrode, a switching element, a noise filter connected between the at least one external electrode and the switching element, at least one first wire to connect the at least one external electrode and the noise filter, a second wire to connect the noise filter and the switching element, and a magnetic filter attached to the second wire. An attenuation characteristic A [dB] and an attenuation characteristic B [dB] satisfy a relationship of B<A, where A is an attenuation characteristic of the noise filter, and B is an attenuation characteristic due to spatial coupling between the at least one first wire and the second wire that is located between the switching element and the magnetic filter.

Advantageous Effects of Invention

The present disclosure can increase a noise propagating to the outside of the power conversion device through the noise filter. As a result, with the noise filter incorporated in the power conversion device, the attenuation characteristic of the noise filter as designed can be still obtained, and the power conversion device can be reduced in size and cost.

DESCRIPTION OF EMBODIMENTS

Figure 1:
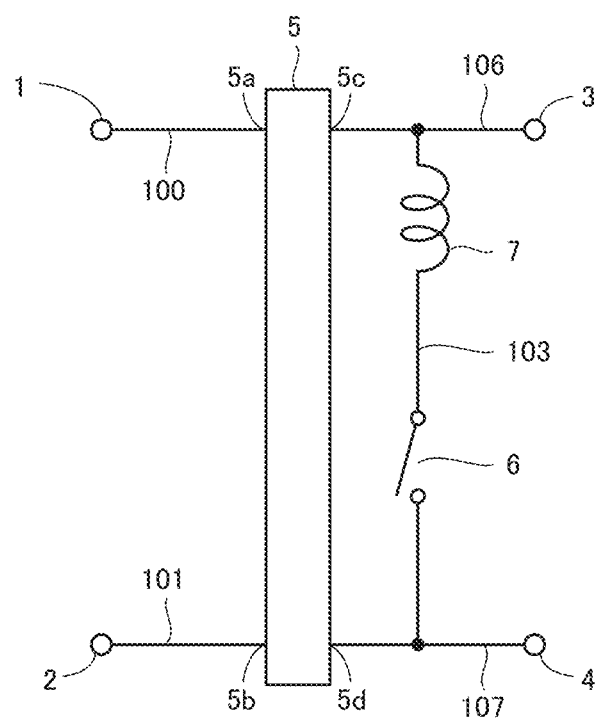
FIG. 1 is a diagram illustrating a first example of a power conversion device according to a first embodiment.

Hereinafter, embodiments of the present disclosure will be described in detail with reference to the drawings. Although a plurality of embodiments will be described, it has been planned at the beginning of the application to appropriately combine the configurations described in the embodiments. The same or corresponding parts in the drawings are denoted by the same reference signs, and the description thereof will not be repeated.

First Embodiment

FIG. 1 is a diagram illustrating a first example of a power conversion device according to a first embodiment. Referring to FIG. 1, a power conversion device according to the first example includes external electrodes 1 to 4, a noise filter 5, a switching element 6, a magnetic filter 7, first wires 100 and 101, a second wire 103, and third wires 106 and 107.

First wire 100 is connected between external electrode 1 and a first input terminal 5a of noise filter 5. First wire 101 is connected between external electrode 2 and a second input terminal 5b of noise filter 5.

Third wire 106 is connected between a first output terminal 5c of noise filter 5 and external electrode 3. Third wire 107 is connected between a second output terminal 5d of noise filter 5 and external electrode 4.

A first terminal of magnetic filter 7 is connected to third wire 106. Second wire 103 is connected between a second terminal of magnetic filter 7 and a first terminal of switching element 6. A second terminal of the switching element is connected to third wire 107. That is, magnetic filter 7, second wire 103, and switching element 6 are connected in series between third wire 106 and third wire 107 in that order. At this time, it is assumed that there is electrical conduction between first wire 100, third wire 106, and second wire 103, and there is electrical conduction between first wire 101 and third wire 107. Here, the fact that there is electrical conduction means that a DC resistance is infinite, and practically, a resistance value measured with a tester or the like is smaller than at least 1 MΩ.

In the first example, an attenuation characteristic between input and output of noise filter 5 is A. In larger magnetic coupling of magnetic coupling between first wire 100 and second wire 103 or magnetic coupling between first wire 101 and second wire 103, an attenuation characteristic due to spatial propagation between the wires is B.

In the present specification, the attenuation characteristic of a filter refers to a characteristic proportional to a ratio of power of a noise output from the filter to power of an electromagnetic noise (hereinafter, also simply referred to as "noise") input to the filter. That is, the fact that the attenuation characteristic in noise filter 5 and the spatial propagation is large means that the power of the output noise is smaller than the power of the input noise.

In general, the ratio of the power of the output noise to the power of the input noise is represented by a logarithm because the output to the input is a significantly small value such as 1/1000 to 1. Specifically, when the power of the input noise is Win [W] and the power of the output noise is Wout [W], the ratio is represented by $10 \times \log_{10}$ (Wout/Win).

In the first example, first wires 100 and 101, second wire 103, and magnetic filter 7 are disposed such that attenuation characteristic B is smaller than attenuation characteristic A (B<A). For example, when attenuation characteristic A of noise filter 5 is A=Wout/Win=0.001 and attenuation characteristic B due to spatial propagation is B=Wout/Win=0.0001, a relationship of B<A is satisfied. When the attenuation characteristic is represented by logarithm, attenuation characteristic A is $10 \times \log_{10}(A) = -30$ dB, and the attenuation characteristic B is $10 \times \log_{10}(B) = -40$ dB, which also satisfy the relationship of B<A.

Since noise power is proportional to a square of a voltage or a square of a current, the above relationship can also be represented by a voltage ratio or a current ratio. In this case, the relationship can be represented by $20 \times \log_{10}$ (Vout/Vin). However, in consideration of a wavelength with respect to a frequency, a distributed constant is considered when a dimension is substantially the same with respect to the wavelength. In such a distributed constant, the values of the voltage and the current vary depending on a position of a measurement point, and thus it is generally desirable to consider power (current×voltage) that is also constant in a distributed constant circuit. An S-parameter (also referred to as scattering matrix or scattering parameter) follows the above concept. In order to measure the S parameter, a network analyzer or a method adopting the network analyzer (for example, an impedance analyzer) is used. In addition to the S parameter, it is also possible to use a method using an LCR meter or a time domain reflectometry (TDR) method.

Figure 2:
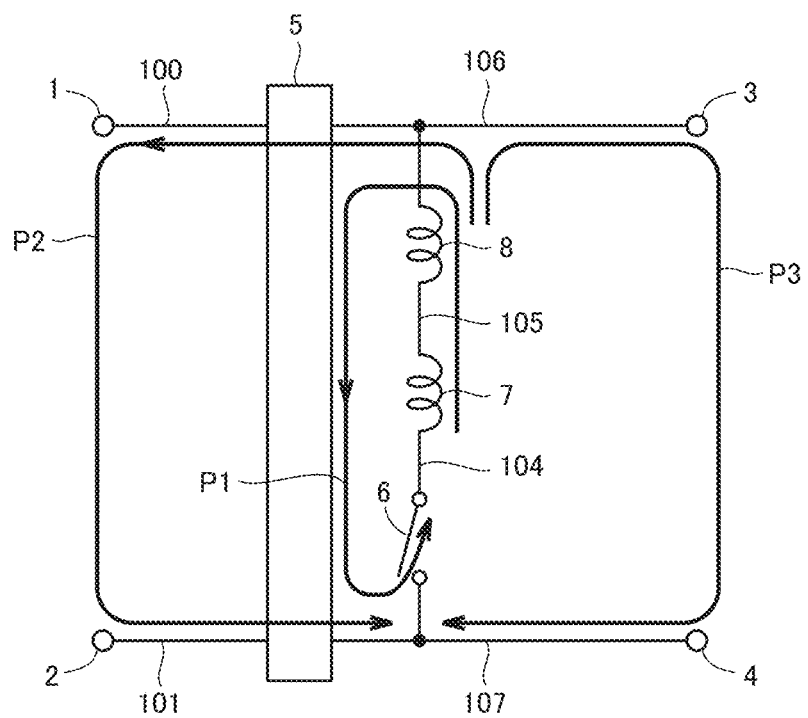
FIG. 2 is a diagram illustrating a second example of the power conversion device according to the first embodiment.

FIG. 2 is a diagram illustrating a second example of the power conversion device according to the first embodiment. Referring to FIG. 2, the power conversion device according to the second example is obtained by adding a reactor 8 to the power conversion device according to the first example illustrated in FIG. 1.

Reactor 8 has a first terminal connected to third wire 106 and a second terminal connected to a first terminal of second wire 105. A second terminal of second wire 105 is connected to the first terminal of magnetic filter 7. Second wire 104 has a first terminal connected between the second terminal of magnetic filter 7 and the first terminal of switching element 6. A second terminal of switching element 6 is connected to third wire 107. That is, reactor 8, second wire 105, magnetic filter 7, second wire 104, and switching element 6 are connected in series between third wire 106 and third wire 107 in that order.

In the second example, an attenuation characteristic of noise filter 5 is A. In larger spatial coupling of spatial coupling between first wire 100 and second wire 104 or spatial coupling between first wire 101 and second wire 104, an attenuation characteristic due to spatial propagation between the wires is B. In the second example, first wires 100 and 101, second wire 104, and magnetic filter 7 are disposed such that attenuation characteristic B is smaller than attenuation characteristic A (B<A).

Next, a specific configuration and operation of the power conversion device according to the first example and the second example will be described.

<External Electrode>

The power conversion device according to the first example and the second example has a circuit configuration of single-phase two-line input and single-phase two-line output. In such a circuit configuration, a power supply device such as a battery, a commercial power supply, or a solar panel, or a power conversion device such as an AC-DC converter described later can be connected to external electrodes 1 and 2. Power is supplied to external electrodes 1 and 2 by these devices. External electrodes 3 and 4 are electrodes (terminals) that output power generated by the power conversion device, and output DC power, AC power, or AC power on which DC power is superimposed.

In accordance with Kirchhoff's law except for a leakage current or an alternating current propagated by a parasitic capacitance between a ground capacitor or a power conversion device and a housing, a current input to external electrodes 1 and 2 is output from external electrode 2 at an equal current value in the opposite direction. A load such as a rotary machine or a battery, or a power conversion device such as a DC-DC converter or an AC-DC converter can be connected to external electrodes 3 and 4.

In the first and second examples, external electrodes 1 and 2 are single-phase two-wire inputs, and external electrodes 3 and 4 are single-phase two-wire outputs. However, it is also possible to support both inputs and outputs of general single-phase three-wire, three-phase three-wire, three-phase four-wire, and the like by changing the number of external electrodes in. In any configuration, the effect of the first embodiment can be obtained.

<Propagation Path of Conduction Noise>

In the power conversion device according to the second example, a conduction noise is caused by noise generated at the moment when switching element 6 is turned on or off (switching noise). As indicated by arrows in FIG. 2, from switching element 6, the noise passes through a first propagation path P1 including second wire 104, magnetic filter 7, second wire 105, reactor 8, third wire 106, noise filter 5, and third wire 107 and returns to switching element 6. Noise that has not been removed by noise filter 5 in first propagation path P1 passes through a second propagation path P2. Second propagation path P2 is a path that passes from switching element 6 through second wire 104, magnetic filter 7, second wire 105, reactor 8, third wire 106, noise filter 5, and first wire 100, flows through external electrode 1, passes through external electrode 2, first wire 101, noise filter 5, and third wire 107, and returns to switching element 6.

Furthermore, the noise flowing from external electrodes 3 and 4 toward the load passes through a third propagation path P3. Third propagation path P3 is a path that passes from switching element 6 through second wire 104, magnetic filter 7, second wire 105, reactor 8, and third wire 106, flows through external electrode 3, passes through the load connected to external electrodes 3 and 4, then passes through external electrode 4 and third wire 107, and returns to switching element 6.

In this manner, the conduction noise propagates through noise filter 5 and the wires. The same applies to other power conversion devices.

<Switching Element>

A semiconductor element is used as switching element 6. Of such a semiconductor element, a semiconductor element used in a power conversion device is referred to as a "power semiconductor element". Examples of the power semiconductor element include a power semiconductor element having a rectifying action, such as a diode, a power semiconductor element having an amplifying action, such as an amplifier, and a power semiconductor element having an action of conducting and blocking a current. Switching element 6 is a power semiconductor element having a rectifying action and an action of conducting and blocking a current.

As a material of the power semiconductor element, a wide band gap semiconductor of silicon (Si), silicon carbide (SiC), gallium nitride (GaN), silicon oxide (SiO), carbon (C), or the like can be used. For the structure of the power semiconductor element, an insulated gate bipolar transistor (IGBT), a metal oxide semiconductor field effect transistor (MOSFET), or the like can be used.

Switching element 6 (power semiconductor element) is mounted on a printed circuit board. The printed circuit board is obtained by forming wires made of a conductor such as copper or aluminum on a dielectric formed of glass epoxy (FR-4: Flame Retardant Type 4), paper phenol (FR-1,2), paper epoxy (FR-3), glass composite (CEM3), or the like. For example, FR-4 is obtained by immersing an epoxy resin in a glass fiber cloth, and has a relative permittivity of about 4.

A snubber circuit can also be used to reduce ringing or the like generated by switching element 6. However, using the snubber circuit will reduce power conversion efficiency, and thus require caution. A heat dissipation mechanism such as a heat dissipation fin can be provided for heat dissipation of switching element 6.

Next, a relationship between the operation of switching element 6 and frequency characteristic generated by the operation will be described.

Figure 3:
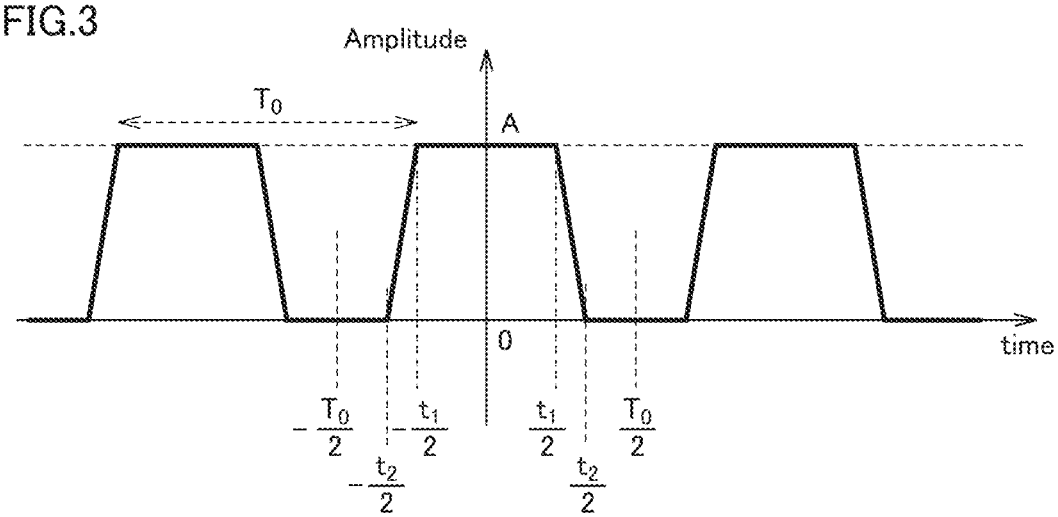
FIG. 3 is a schematic diagram illustrating a time waveform of a voltage applied to a switching element.

FIG. 3 is a schematic diagram illustrating a time waveform of a voltage applied to switching element 6.

In a case where switching element 6 is an IGBT, when a gate signal from a gate drive circuit (not shown) is turned on, switching element 6 is turned on, a voltage between a collector and an emitter drops to 0%, and a current flows between the collector and the emitter. On the other hand, when the gate signal is turned off, switching element 6 is turned off, the current is blocked, and the voltage between the collector and the emitter rises to 100%. As a result, a waveform as illustrated in FIG. 3 can be created. When switching element 6 is a MOSFET, the current between a drain and a source is conducted or blocked according to turning on and off of the gate signal input from the gate drive circuit.

When Si is used as the material of the power semiconductor element, switching element 6 can be configured by an IGBT in order to obtain a withstand voltage. When a wide band gap semiconductor is used as the material, the withstand voltage is high as a material characteristic, and thus switching element 6 can be configured by a MOSFET which is easily driven at a high speed.

As described above, the power semiconductor element serves as a switch that conducts and blocks a current by turning on and off the gate signal, and is thus called a switching element. Then, by operating the switching element, magnetic energy is accumulated in a reactor (also referred to as coil, inductor, or inductance) connected to the switching element, and by releasing the magnetic energy from the reactor, desired output power can be generated.

In a Si semiconductor, an operation frequency (hereinafter, also referred to as a driving frequency) of the switching element is usually set to about 10 kHz to 100 kHz in consideration of a relationship between heat generated by a switching loss and heat dissipation. In a wide band gap semiconductor, the driving frequency is usually set to about 30 kHz to 1 MHz.

However, when an output voltage or an output current of the power conversion device is large, the switching loss becomes larger than when the output voltage or the output current is small, and thus, the driving frequency may be lowered. In the present specification, a high output voltage refers to a voltage of greater than or equal to DC 300 V.

In the present embodiment, it is considered that the switching element is configured by a combination of a semiconductor, a bonding wire extending from the semiconductor, and a lead wire connected to the bonding wire, and the bonding wire and the lead wire may also be considered as a part of the second wire.

In a case where switching element 6 is an IGBT, the voltage between the collector and the emitter decreases from 500 V to 0 V within a time of about 30 ns to 100 ns when switching element 6 is turned on, and increases from 0 V to 500 V within a time of about 30 ns to 100 ns when switching element 6 is turned off. In a case where switching element 6 is a MOSFET, the voltage between the drain and the source decreases from 500 V to 0 V within a time of about several ns to 30 ns when switching element 6 is turned on, and increases from 0 V to 500 V within a time of about several ns to 30 ns when switching element 6 is turned off.

Except for ringing, the current shows a temporal change opposite to a temporal change of the voltage described above. Therefore, when switching element 6 is turned on, the voltage decreases to 0 V, and the current increases from 0 A to several dozens of A. A time waveform of the voltage and the current at this time have a trapezoidal wave shape as illustrated in FIG. 3.

In FIG. 3, one cycle $T_0$ of a voltage waveform corresponds to a reciprocal of the driving frequency of switching element 6. In an example in FIG. 3, a rise time of the voltage is set to a time from 0% to 100% (a time from time −t2/2 to time −t1/2), and a fall time of the voltage is set to a time from 100% to 0% (a time from time t1/2 to time t2/2), but the definitions of the rise time and the fall time are not limited thereto.

Note that, in an actual switching operation, ringing (overshoot and undershoot) occurs at the time of rising and falling, and thus the time waveform of the voltage and the current do not ideally have a trapezoidal wave shape in some cases. The ringing is a high frequency component (noise) superimposed on a trapezoidal wave, and depends exclusively on a design of a device such as a residual inductance of a wire. Therefore, in the present embodiment, the ringing is ignored, and the time waveform of the voltage and the current is treated as an ideal trapezoidal wave.

Figure 4:
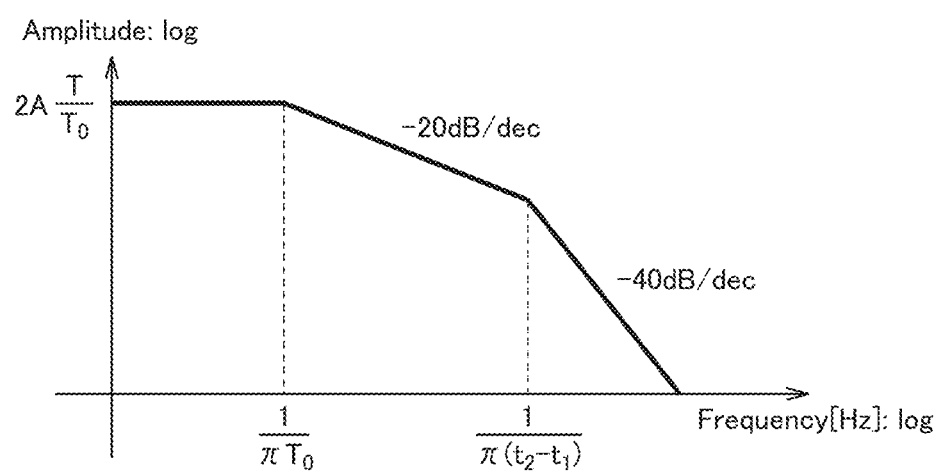
FIG. 4 is a schematic diagram illustrating a frequency spectrum obtained by performing Fourier transform on the time waveform illustrated in FIG. 3.

FIG. 4 is a schematic diagram illustrating a frequency spectrum obtained by performing Fourier transform on the time waveform illustrated in FIG. 3. The frequency spectrum illustrated in FIG. 4 is obtained by taking both logarithms with a horizontal axis as the frequency and a vertical axis as the voltage.

The Fourier transform is performed in a state where both ends of the time waveform have an equal value (usually, 0 V or 0 A). When both ends of the time waveform do not have an equal value, a window function such as a Hamming window or a Harming window is applied to the time waveform.

The frequency spectrum illustrated in FIG. 4 has a constant amplitude in a frequency range of 0 [Hz] to $1/(\pi T_0)$ [Hz]. In a frequency range of $1/(\pi T_0)$ [Hz] to $1/\{\pi(t2-t1)\}$ [Hz], when the frequency becomes 10 times, an envelope of the amplitude decreases by −20 dB (which is also referred to as −20 dB/dec). In the frequency range of greater than or equal to $1/\{\pi(t2-t1)\}$ [Hz], the envelope of the amplitude decreases by −40 dB/dec.

As described above, the time waveform of the voltage or the current during the switching operation has a wide range of frequency components from low frequency components to high frequency components. Among the frequency components, a frequency component of greater than or equal to $1/(\pi T_0)$ [Hz] corresponds to noise and is to be reduced.

When the rise time and the fall time of the time waveform are different from each other, it is preferable to calculate the frequency component using the shorter time so as not to underestimate noise. Alternatively, the evaluation may be performed using a waveform after Fourier transform instead of the envelope.

<Reactor>

In the power conversion device according to the second example (see FIG. 2), the wire between switching element 6 and reactor 8 is required to be designed such that a wiring length of a wiring pattern and a cable on the printed circuit board configuring the wire is as short as possible.

However, since reactor 8 is disposed close to a heat dissipation plate or a heat dissipation fin for heat dissipation, in practice, reactor 8 is often disposed apart from switching element 6 mounted on the printed circuit board. Since reactor 8 is formed of a magnetic material such as an iron-based material and has a large weight, reactor 8 is disposed outside of the printed circuit board in some cases in order to avoid deformation of the printed circuit board. In the present embodiment, reactor 8 may be considered to be configured by a wire wound around a magnetic body and a lead wire extending from the wire, and the lead wire may also be considered to be a part of the second wire.

In such a case, as shown in the second example, magnetic filter 7 can be mounted between switching element 6 and reactor 8. Specifically, in consideration of the attenuation characteristic of noise filter 5, the wiring length of the wiring pattern or the cable constituting second wire 104 between switching element 6 and magnetic filter 7, routing of the wire, and the like are designed.

At this time, the propagation characteristic (attenuation characteristic B) of noise due to magnetic coupling between second wire 104 and first wires 100 and 101 is reduced to be smaller than attenuation characteristic A of noise filter 5 (B<A). Preferably, attenuation characteristic B is designed to satisfy B [dB]+6 dB<A [dB]. By setting attenuation characteristic B with a margin of 6 dB or more in this manner, it is possible to generate a significant difference between attenuation characteristic A and attenuation characteristic B in consideration of a manufacturing error or a measurement error such as routing of a cable and a wiring pattern.

<Magnetic Filter>

The frequency characteristic of magnetic filter 7 generally varies depending on a material of magnetic filter 7. For magnetic filter 7, Mn—Zn based ferrite, Ni—Zn based ferrite, or the like is used in accordance with the driving frequency of switching element 6. The Mn—Zn based ferrite can reduce noise of about 1 kHz to 1 MHz. The Ni—Zn based ferrite can reduce noise of about 1 MHz to 300 MHz. Furthermore, by optimizing the material or shape of magnetic filter 7, it is also possible to form magnetic filter 7 having a large impedance in a specific frequency band.

As magnetic filter 7, a normal mode choke coil, a ferrite bead, or the like can be mounted on second wire 103 of the first example (see FIG. 1) and second wires 104 and 105 of the second example (see FIG. 2). Alternatively, as a ferrite core, magnetic filter 7 can be mounted in a non-contact manner by winding a cable in a state where second wire 104 and second wire 105 are connected.

Since a magnetic body may be magnetically saturated when a current capacity increases, a magnetic body that is not magnetically saturated at a maximum rated current of the power conversion device is used for magnetic filter 7. Magnetic saturation can be avoided by providing a gap (void) in the magnetic body or using a magnetic body having a small relative permeability. Alternatively, magnetic saturation can be also avoided by providing a heat dissipation mechanism in the magnetic body or using a magnetic body having a large cross-sectional area. It is also possible to use a magnetic body that is less likely to be saturated, is less likely to retain magnetic energy, and has a small counter electromotive force (small noise) when the current is turned off, such as SPIKE KILLER (amorphous magnetic body) manufactured by Toshiba Materials Co., Ltd.

A gap may be formed in magnetic filter 7. As a winding method at the time of attaching the wire to magnetic filter 7, when it is not necessary to consider the parasitic capacitance between the wires, cancel winding, bifilar winding, or the like can be used. A split ferrite core may be used so as to retrofit magnetic filter 7 to a cable or the like.

In the frequency characteristic of the impedance of magnetic filter 7, the impedance at a target frequency is desirably large. The impedance of magnetic filter 7 is given by 2πfL (f is a frequency [Hz]), where L is a self-inductance of magnetic filter 7. However, since the self-inductance of the cable is about 1 nH/mm, which is smaller than the self-inductance of magnetic filter 7, the effect of magnetic filter 7 can be obtained regardless of an inductance value of magnetic filter 7.

<Noise Filter>

As noise filter 5, at least one of a common mode choke coil, a normal mode choke coil, an interline capacitor (also referred to as an X capacitor), a ground capacitor (also referred to as a Y capacitor), or a resistance element can be used. Since components used for dielectric lightning countermeasures, such as a varistor and an arrester, have a capacitance component of about several tenths of one pF to several hundred pF, these components can be used as an interline capacitor or a ground capacitor.

Figure 5:
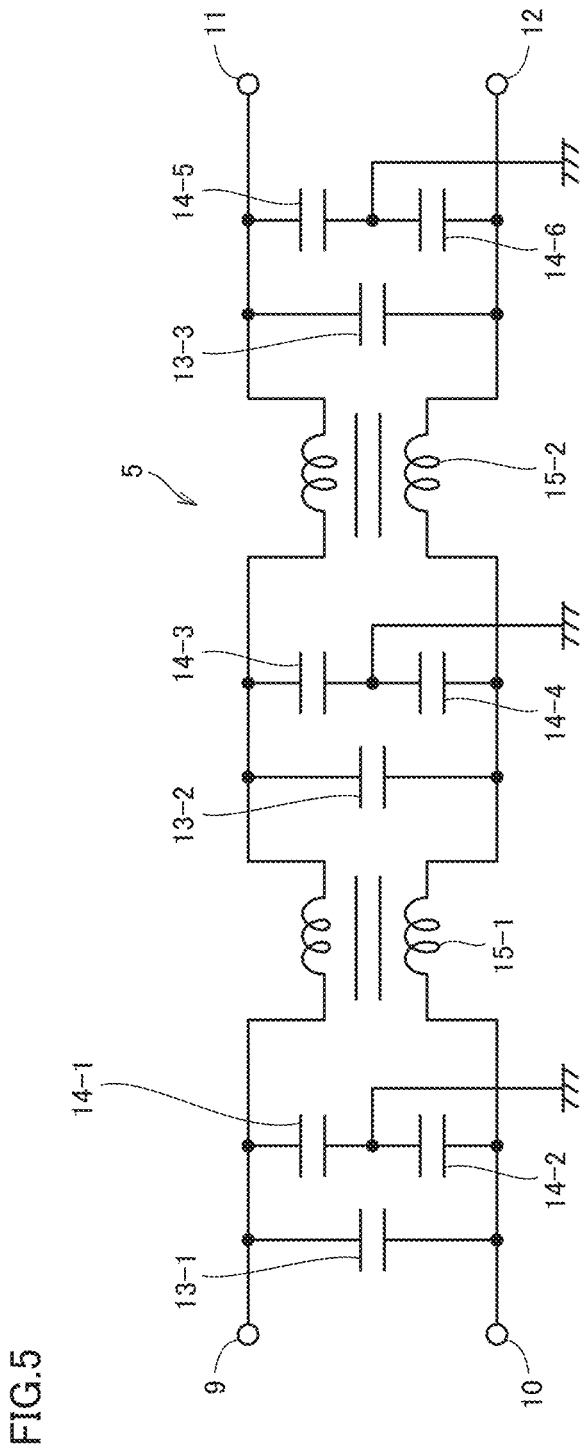
FIG. 5 is a diagram illustrating a first configuration example of a noise filter.

FIG. 5 is a diagram illustrating a first configuration example of noise filter 5. As illustrated in FIG. 5, noise filter 5 according to the first configuration example includes input terminals 9 and 10, output terminals 11 and 12, interline capacitors 13-1, 13-2, and 13-3, ground capacitors 14-1, 14-2, 14-3, 14-4, 14-5, and 14-6, and common mode choke coils 15-1 and 15-2. In the following description, interline capacitors 13-1, 13-2, and 13-3 are also collectively referred to as an interline capacitor 13. Ground capacitors 14-1, 14-2, 14-3, 14-4, 14-5, and 14-6 are also collectively referred to as a ground capacitor 14. Common mode choke coils 15-1 and 15-2 are also collectively referred to as a common mode choke coil 15.

Input terminal 9 is connected to external electrode 1, and input terminal 10 is connected to external electrode 2. Output terminal 11 is connected to external electrode 3, and Output terminal 12 is connected to external electrode 4. Ground capacitor 14 may be at a reference potential in the housing or the printed circuit board that is a reference potential of the power conversion device, and does not need to be connected to earth (ground, ground potential). The noise attenuation characteristic can be improved by arranging ground capacitors 14 in multiple stages. By connecting two ground capacitors 14 in series between the wires, ground capacitors 14 can also function as a part of the interline capacitor.

Figure 6:
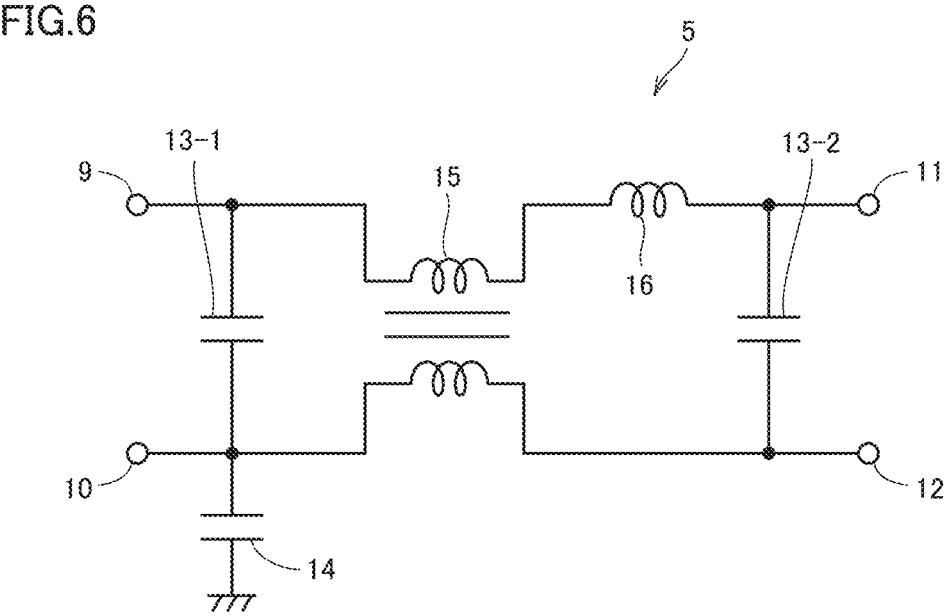
FIG. 6 is a diagram illustrating a second configuration example of the noise filter.

FIG. 6 is a diagram illustrating a second configuration example of noise filter 5. As illustrated in FIG. 6, noise filter 5 according to the second configuration example includes input terminals 9 and 10, output terminals 11 and 12, interline capacitors 13-1 and 13-2, ground capacitor 14, common mode choke coil 15, and normal mode choke coil 16.

As the choke coils, choke coils having a larger allowable current than a flowing current are used so as not to be magnetically saturated. In particular, the normal mode choke coil may be magnetically saturated to greatly deteriorate characteristics as a filter, and thus is desirably designed not to be magnetically saturated even when the maximum rated current flows.

In FIGS. 5 and 6, the single-phase two-line noise filter is illustrated, but noise filters such as single-phase three-line, three-phase three-line, and three-phase four-line can be similarly designed.

<Cable>

Description will be made of a cable used for connecting components outside of the printed circuit board in the power conversion device according to the first embodiment.

The cable may be either a single wire or a stranded wire such as a litz wire. Copper, aluminum, or iron having high conductivity is generally used as a material of the cable, but these alloys or another material may be used. A wire diameter of a conductive wire may be any wire diameter as long as the maximum rated current can flow. A thickness and a material of a covering member that covers an outer periphery of the conductive wire are not limited. However, in consideration of the fact that a dielectric breakdown voltage of the conductive wire is about 1 kV/mm, it is necessary for a dielectric breakdown voltage of the covering member to be not less than 1 kV/mm.

When the cable and the printed circuit board are connected or the cable and the reactor are connected, a connector such as a fastening terminal is attached to a tip of the cable by crimping, screwing, soldering, or the like. When two cables are connected, a terminal block, a bolt, a nut, or the like can be used. However, a week connection between the cable and the other components will increase a contact resistance, and the cable or the components may be damaged by heat. It is therefore necessary to connect the cable and the other components so as to reduce the contact resistance. Specifically, when a contact force between the components is Ftc [N] and the contact resistance is Rtc [Ω], Rtc is proportional to $1/\sqrt{Ftc}$. That is, the contact resistance decreases as the contact force increases.

<Load>

Another power conversion device, a rotary machine (motor, compressor, or the like), or a secondary battery is connected as a load to external electrodes 3 and 4 of the power conversion device according to the first embodiment. Alternatively, external electrodes 3 and 4 are connected to an IC, an electric heater such as an electric heating wire, a light source, or sensors that consume power and execute calculation.

<Target of Noise Design>

The "conduction noise" generally refers to a high-frequency signal propagating through a cable such as a power supply line connected to the outside of an electronic device on which the power conversion device is mounted. A "radiation noise" generally refers to a high-frequency signal propagating to the outside of a device through a space. The conduction noise is also referred to as noise terminal voltage, conduction emission, conduction EMI, conduction disturbing wave, interfering power, noise power, and the like. The radiation noise is also referred to as radiation emission, radiation EMI, radiation interfering wave, interfering wave power, and the like.

For an EMC test, which is a noise test, standards for a measurement method and a limit value are specified for each type of electronic device by law or regulation. Therefore, a representative standard will be described in the first embodiment. However, the first embodiment is also effective for other standards.

In a measurement of the conduction noise, peak (PK) detection, quasi-peak (QP) detection, and average value (AV) detection are generally used. The conduction noise is measured by measuring output of a pseudo power supply circuit network (also referred to as LISN or AMN) with a measuring instrument such as a spectrum analyzer or EMI receiver.

In a measurement of the radiation noise, a reception antenna is installed at a distance of 1 m to 10 m from the electronic device, and an electromagnetic wave output from the electronic device is received by the reception antenna. An antenna end voltage is measured in accordance with the peak (PK) detection, the quasi-peak (QP) detection, and the average value (AV) detection, and horizontal polarization or vertical polarization is measured. Furthermore, in consideration of directivity of a radio wave, measurement is performed using a turntable or a height pattern measurement device.

Examples of the standard include CISPR (Comite International Special des Perturbations Radioelectriques) 11, CISPR 14, CISPR 15, CISPR 25, CISPR 32, and IEC (International Electrotechnical Commission). Japan has the Electrical Appliances and Materials Safety Act.

For example, in the IEC, a standard of conduction noise is specified in a range of 150 kHz to 30 MHz. In the IEC, a standard of radiation noise is specified in a range of 30 MHz to 1 GHz.

Since a high-frequency noise may interfere the operation of the electronic device and may destroy an electronic circuit inside the electronic device, the standard is specified so as not to cause such problems. For example, in an air conditioner, a standard of switching noise is specified in a range of greater than or equal to 500 kHz in the Electrical Appliances and Materials Safety Act, and a standard of switching noise is specified in a range of greater than or equal to 150 kHz in the CISPR. The power conversion device according to the first embodiment can reduce noise in the above frequency ranges.

<Types of Converters>

The power conversion device according to the first embodiment can construct the following four types of power converters by using a power semiconductor element as switching element 6.

A first power converter is a DC-AC converter (also referred to as an inverter), and generates drive power for a motor, coil, or the like including a compressor. A second power converter is an AC-DC converter, and is used to charge a secondary battery or the like from a commercial power supply. A third power converter is a DC-DC converter, and performs a step-up operation and/or a step-down operation so as to output a desired DC voltage. A fourth power converter is an AC-AC converter (also referred to as a matrix converter), and can generate an AC power supply of a desired frequency.

Note that the power conversion device can be configured by combining a plurality of types of power converters. For example, by combining an AC-DC converter and a DC-AC converter, the power conversion device can generate an alternating current (AC) of any frequency for driving the rotary machine from a commercial alternating current power supply (AC). Furthermore, by using an AC-DC converter, a step-up DC-DC converter, and a DC-AC converter, a converter with high power conversion efficiency can be configured.

In order to control turning on and off of a switching element included in the power converter, a gate driving IC is generally used. The gate driving IC is configured to control a gate voltage or a gate current of the switching element.

The four types of power converters include a power converter in which an input and an output are not isolated and a power converter in which an input and an output are isolated. Unless otherwise specified in the first embodiment, a non-isolated power converter is used. Note that the effect of the first embodiment can also be obtained by using an isolated power converter.

(1) DC-DC Converter

Among the DC-DC converters, a small DC-DC converter used as a power supply of an electronic device is also referred to as a switching regulator. The power conversion device according to the first embodiment can be applied to a switching regulator. The switching regulator may be controlled in any of a current continuous mode, a current discontinuous mode, or a current critical mode.

Hereinafter, as an application example of the power conversion device according to the first embodiment, each of a step-up DC-DC converter, a step-down DC-DC converter, a step-up/step-down DC-DC converter, and a four-quadrant chopper circuit will be described sequentially.

(1-1) Step-Up DC-DC Converter

Figure 7:
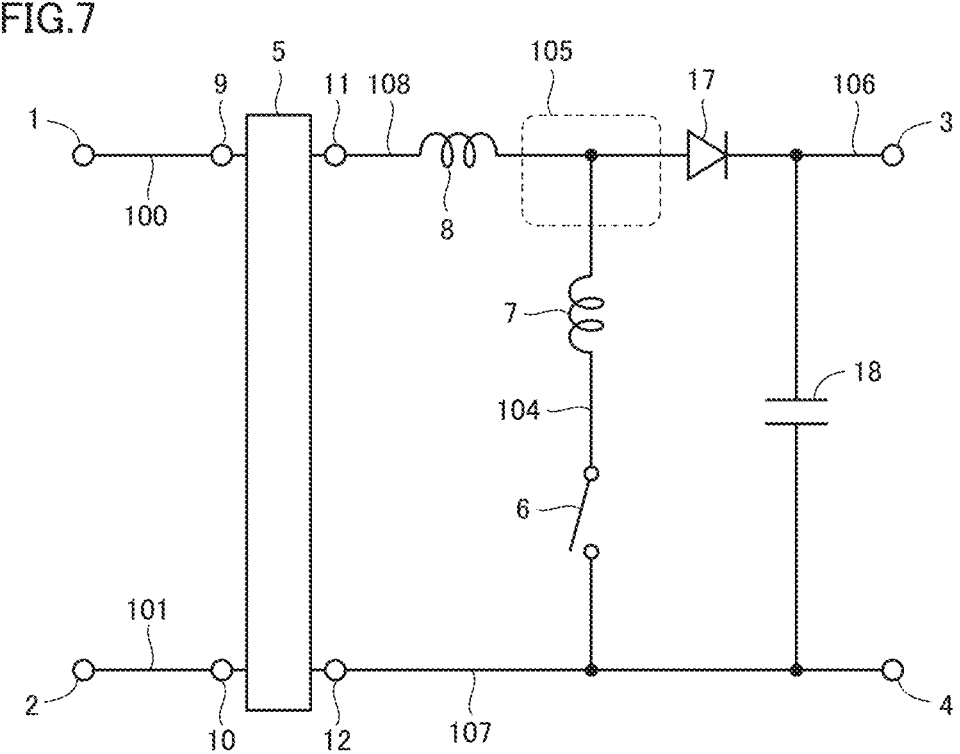
FIG. 7 is a diagram illustrating a first configuration example of a step-up DC-DC converter to which the power conversion device according to the first embodiment is applied.

FIG. 7 is a diagram illustrating a first configuration example of the step-up DC-DC converter to which the power conversion device according to the first embodiment is applied. The step-up DC-DC converter illustrated in FIG. 7 is obtained by adding a diode 17 and a smoothing capacitor 18 to the power conversion device according to the second example (see FIG. 2). Diode 17 has an anode connected to second wire 105 and a cathode connected to third wire 106. Smoothing capacitor 18 is connected between third wire 106 and third wire 107.

Reactor 8 accumulates energy of a DC power supply supplied via external electrode 1 as magnetic energy in response to switching element 6 being turned on. When switching element 6 is turned off, reactor 8 releases the accumulated magnetic energy. Since the released magnetic energy is superimposed on the output voltage of the DC power supply, the step-up DC-DC converter can output a voltage higher than the output voltage of the DC power supply.

When the voltage is output, the voltage is also applied to both ends of smoothing capacitor 18, and thus electric energy is accumulated in smoothing capacitor 18. When the output voltage decreases, smoothing capacitor 18 releases the accumulated electric energy. As a result, the output voltage can be stabilized. As smoothing capacitor 18, a capacitor having a capacitance of about several hundred nF to several dozens of mF can be used.

Diode 17 is provided to prevent a current from flowing from smoothing capacitor 18 to an input side when switching element 6 has been turned off. As a result, a decrease in the output voltage can be suppressed. Diode 17 is also referred to as a freewheeling diode.

In the example in FIG. 7, magnetic filter 7 is connected in series with switching element 6 via second wire 104. Magnetic filter 7 is connected to reactor 8 and diode 17 via second wire 105. In this configuration, magnetic filter 7, diode 17, and reactor 8 are desirably disposed close to each other on the same board. However, as described above, when reactor 8 is disposed outside of the printed circuit board on which switching element 6 and diode 17 are mounted in consideration of heat dissipation and weight, reactor 8, magnetic filter 7, and diode 17 are connected by cables. Therefore, magnetic filter 7 does not need to be mounted on the printed circuit board.

In the example in FIG. 7, since reactor 8 is connected to external electrode 1 via noise filter 5, the attenuation characteristic obtained by combining reactor 8 and noise filter 5 can be regarded as the attenuation characteristic of noise filter 5. However, since a strong magnetic field is formed around reactor 8, when reactor 8 and noise filter 5 are disposed close to each other with about several mm to several cm, it is necessary to compare the attenuation characteristic of noise filter 5 alone with the attenuation characteristic by spatial coupling including magnetic coupling between noise filter 5 and reactor 8. When a significant difference from an attenuation amount of noise filter 5 alone cannot be obtained in an attenuation amount in the attenuation characteristic by the spatial coupling including the magnetic coupling, it is necessary to provide a shield or the like.

As described above, a wire configuring reactor 8 as a part of second wire 105, a wire configuring diode 17 as a part of second wire 105, and a wire configuring switching element 6 as a part of second wire 104 may be considered. In particular, since reactor 8 is easily magnetically coupled to the magnetic body configuring noise filter 5, it is necessary to design a magnetic filter or the like in accordance with the attenuation characteristic according to the present embodiment for a portion that is easily magnetically coupled as described above.

Figure 8:
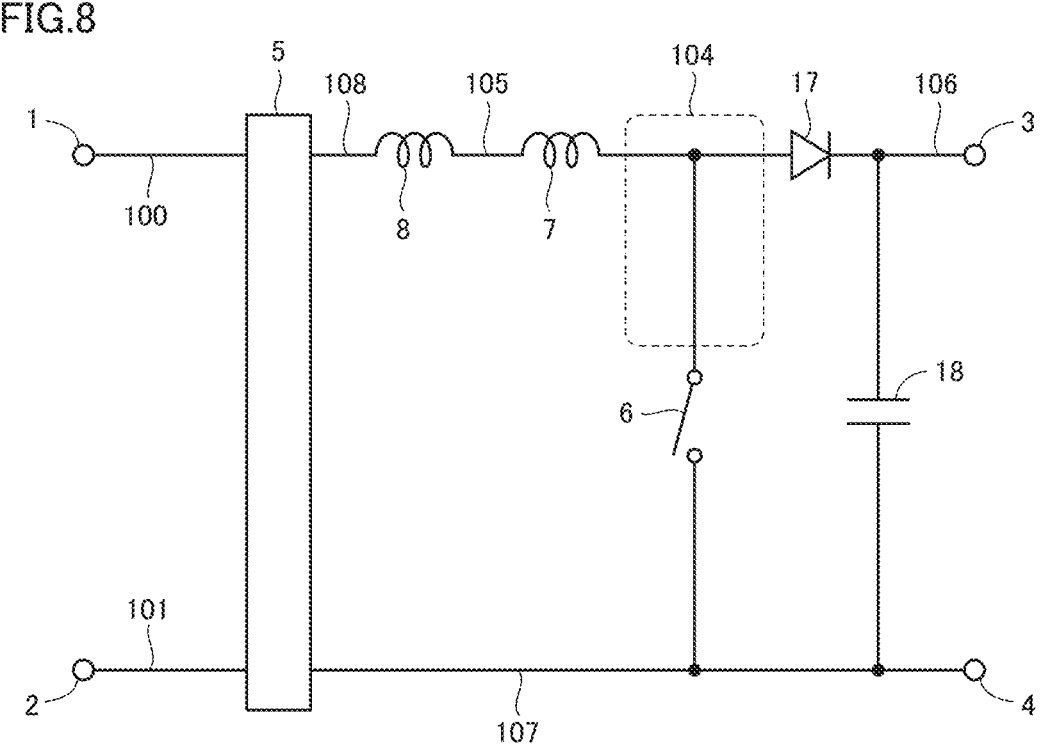
FIG. 8 is a diagram illustrating a second configuration example of the step-up DC-DC converter to which the power conversion device according to the first embodiment is applied.

FIG. 8 is a diagram illustrating a second configuration example of the step-up DC-DC converter to which the power conversion device according to the first embodiment is applied.

The second configuration example illustrated in FIG. 8 is different from the first configuration example illustrated in FIG. 7 in a position of magnetic filter 7. In the second configuration example, magnetic filter 7 is connected to switching element 6 and diode 17 via second wire 104.

The second configuration example can be applied in a case where a total length of second wire 104 and second wire 105 connecting switching element 6 and reactor 8 is longer than a length of second wire 104 connecting switching element 6 and diode 17.

In particular, when reactor 8 is not disposed on the same board as switching element 6, and reactor 8 and switching element 6 are connected by a cable, magnetic filter 7 such as a ferrite core is provided in the cable.

In FIG. 7, since a current flowing through second wire 104 is large, using magnetic filter 7 having a large resistance component will decrease the power conversion efficiency due to heat generation of magnetic filter 7. On the other hand, when magnetic filter 7 having a large inductance component is used in order to increase an impedance component while reducing the resistance component, the magnetic energy accumulated in magnetic filter 7 becomes a voltage source at the moment when switching element 6 is turned off. As a result, a counter electromotive force is applied to both ends of switching element 6, and a propagation path of noise due to parasitic capacitances at both ends of switching element 6 is formed. Thus, switching noise is easily generated. Therefore, magnetic filter 7 desirably has a small resistance component and hardly holds magnetic energy.

On the other hand, in a case where magnetic filter 7 is disposed in series with reactor 8 as shown in FIG. 8, in a current path through which the magnetic energy accumulated in magnetic filter 7 flows, the impedance of a series circuit of diode 17 and smoothing capacitor 18 is smaller than the impedance at both ends of switching element 6 and the impedance of a load circuit connected to external electrodes 3 and 4. Thus, the counter electromotive force is less likely to be generated at both ends of switching element 6. That is, it is possible to make it difficult to generate switching noise. Therefore, when the magnetic coupling between second wire 104 and first wires 100 and 101 can be allowed, it is desirable to arrange magnetic filter 7 as illustrated in FIG. 8.

(1-2) Step-Down DC-DC Converter

Figure 9:
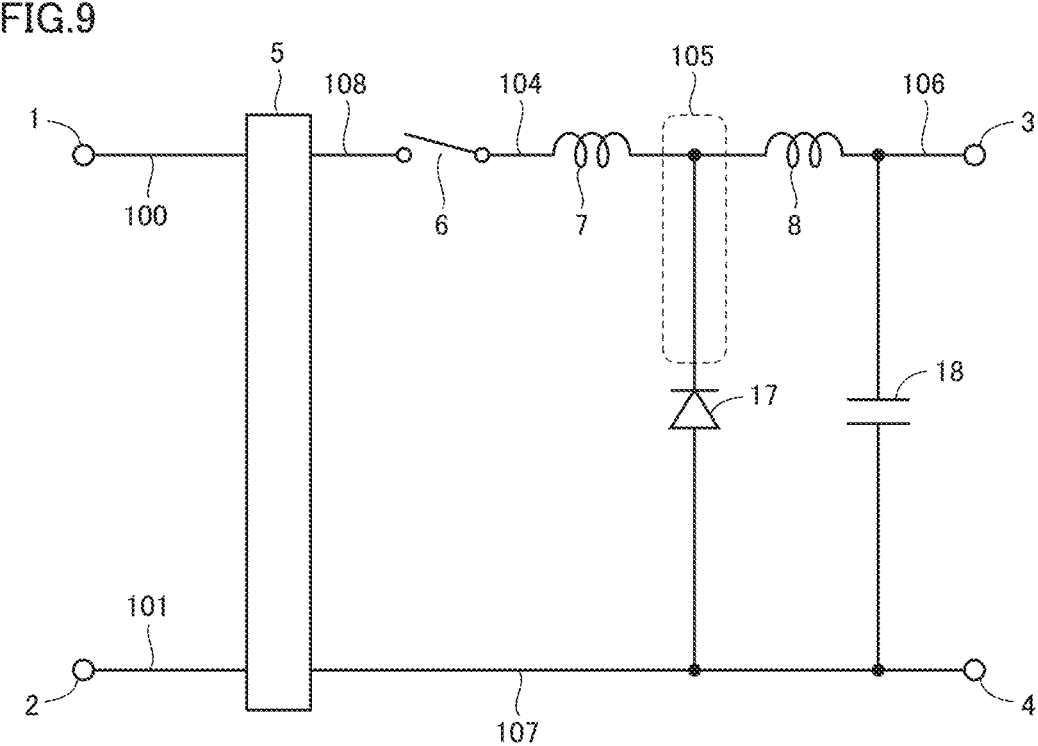
FIG. 9 is a diagram illustrating a configuration example of a step-down DC-DC converter to which the power conversion device according to the first embodiment is applied.

FIG. 9 is a diagram illustrating a configuration example of the step-down DC-DC converter to which the power conversion device according to the first embodiment is applied.

In the step-down DC-DC converter illustrated in FIG. 9, similarly to the step-up converter described above, magnetic energy is accumulated in reactor 8 when switching element 6 has been turned on. At this time, a current flows only through reactor 8 by a backflow prevention action of diode 17 (freewheeling diode). When switching element 6 is turned off, the magnetic energy accumulated in reactor 8 is released to the load. However, unlike at a time of step-up, the voltage and the current on a power supply side are blocked by switching element 6, and therefore, a voltage stepped down to an arbitrary voltage according to on-duty of switching element 6 can be output.

In the step-down DC-DC converter illustrated in FIG. 9, since reactor 8 is not connected between switching element 6 and noise filter 5, the attenuation characteristic of noise filter 5 is compared with the attenuation characteristic due to spatial coupling between second wire 104 and first wire 100 or 101. The attenuation characteristic of the spatial coupling needs to be smaller than the attenuation characteristic of the noise filter 5.

In the example in FIG. 9, by mounting magnetic filter 7 between switching element 6 and reactor 8, the attenuation characteristic due to spatial coupling can be made smaller than the attenuation characteristic of noise filter 5. This makes it possible to enhance an apparent attenuation characteristic of noise filter 5.

(1-3) Step-Up/Step-Down DC-DC Converter

Figure 10:
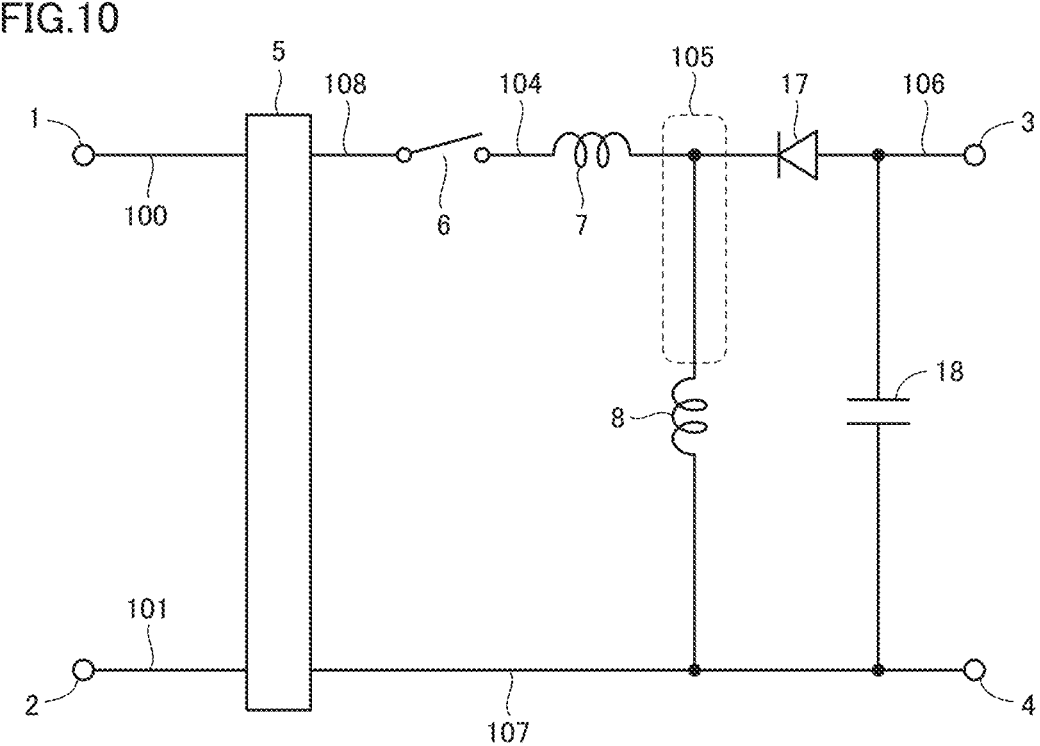
FIG. 10 is a diagram illustrating a configuration example of a step-up/step-down converter to which the power conversion device according to the first embodiment is applied.

FIG. 10 is a diagram illustrating a configuration example of the step-up/step-down converter to which the power conversion device according to the first embodiment is applied.

The step-up/step-down converter illustrated in FIG. 10 is similar to the step-up converter illustrated in FIG. 7, but is different from the step-up converter in that a power supply is not connected between external electrodes 1 and 2 when the magnetic energy accumulated in reactor 8 is released. In such a configuration, the step-up/step-down converter can control the output voltage to 0 or more, and thus can be used for both a step-up circuit and a step-down circuit. However, it is necessary to use a reactor having a large inductance value as reactor 8.

In the step-up/step-down DC-DC converter, magnetic filter 7 is also connected to second wire 104. Magnetic filter 7 is connected to diode 17 and reactor 8 via second wire 105. As in the step-up DC-DC converter, when reactor 8 is not disposed on the same board as switching element 6, and reactor 8 and switching element 6 are connected by a cable, magnetic filter 7 such as a ferrite core is provided in the cable.

(1-4) Four-Quadrant Converter

Figure 11:
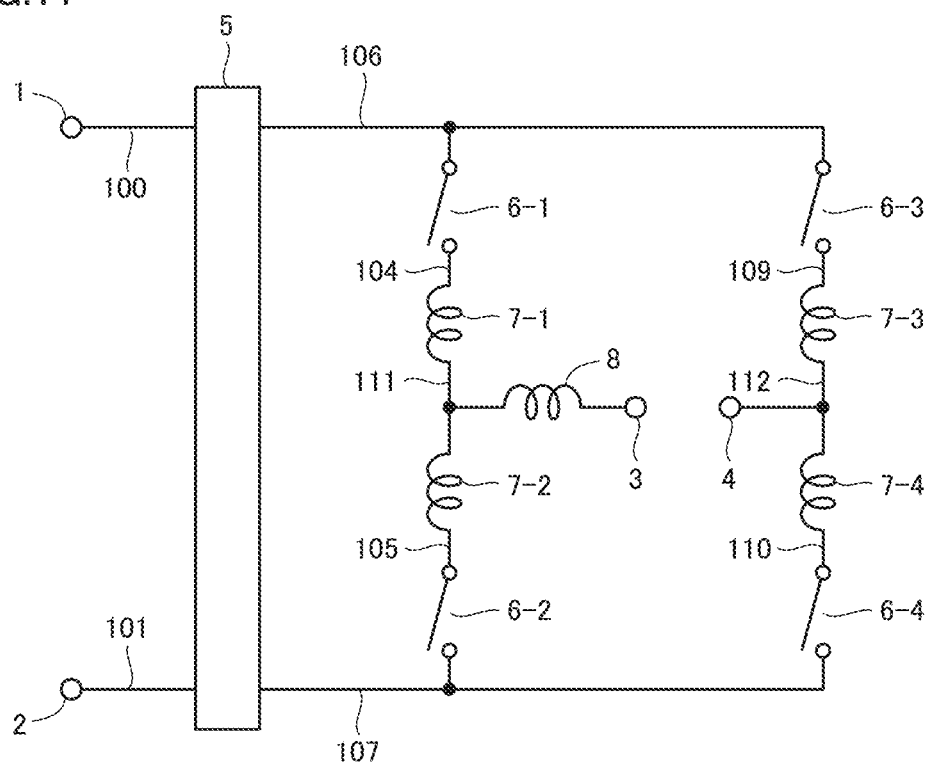
FIG. 11 is a diagram illustrating a configuration example of a four-quadrant converter to which the power conversion device according to the first embodiment is applied.

FIG. 11 is a diagram illustrating a configuration example of a four-quadrant converter to which the power conversion device according to the first embodiment is applied. The four-quadrant converter is a circuit that can output any combination of positive (output) and negative (input) DC output voltages and positive and negative output currents.

The four-quadrant converter illustrated in FIG. 11 can execute four types of operations including power-running and regeneration in a positive direction (a direction in which a current flows from external electrode 3 to external electrode 4) and power-running and regeneration in a negative direction (a direction in which a current flows from external electrode 4 to external electrode 3) by controlling turning on and off of the plurality of switching elements.

In the example in FIG. 11, the four-quadrant converter includes four switching elements 6-1 to 6-4, reactor 8, four magnetic filters 7-1 to 7-4, and noise filter 5. The four-quadrant converter includes first wires 100 and 101, second wires 104, 105, and 109 to 112, and third wires 106 and 107.

Magnetic filter 7-1 is connected to switching element 6-1 via second wire 104, and is connected to reactor 8 via second wire 111. Magnetic filter 7-2 is connected to switching element 6-2 via second wire 105, and is connected to reactor 8 via second wire 111. Magnetic filter 7-3 is connected to switching element 6-3 via second wire 109, and is connected to reactor 8 via second wire 112. Magnetic filter 7-4 is connected to switching element 6-4 via second wire 110, and is connected to reactor 8 via second wire 112.

The above configuration can reduce spatial coupling between each of second wire 104, second wire 105, second wire 109, and second wire 110 and first wires 100 and 101. As a result, since the attenuation characteristic due to the spatial coupling can be made smaller than the attenuation characteristic of noise filter 5, the attenuation characteristic of noise filter 5 can be substantially enhanced.

Such a configuration can be achieved by routing first wires 100 and 101 and second wires 104, 105, 109, and 110 together with positions where magnetic filters 7-1 to 7-4 are connected. However, it is not necessary to provide magnetic filter 7 for all of four switching elements 6-1 to 6-4. For example, in a case where a wire distance between first wires 100 and 101 and any of second wire 104, 105, 109, or 110 can be increased, spatial coupling can be reduced, and thus magnetic filter 7 can be provided only in some of the switching elements.

Figure 12:
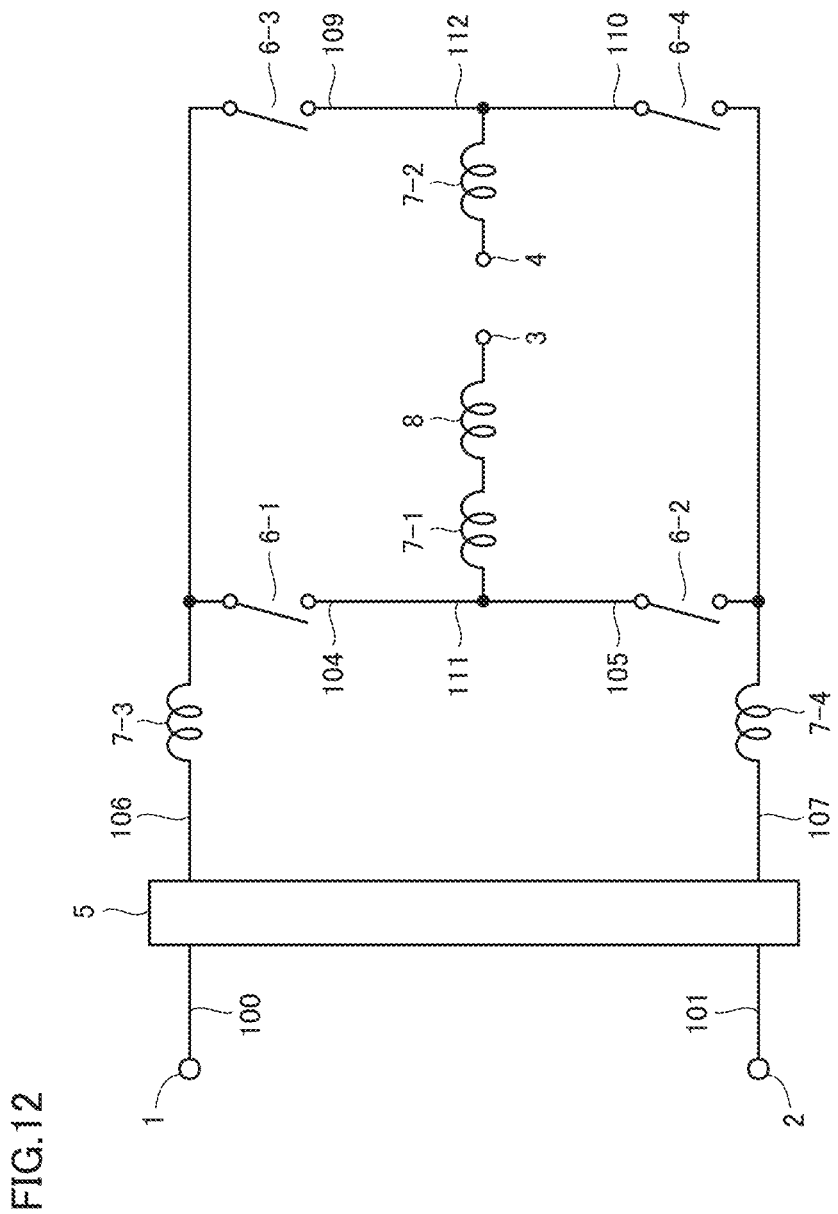
FIG. 12 is a diagram illustrating a configuration example of the four-quadrant converter to which the power conversion device according to the first embodiment is applied.

When the spatial coupling between second wires 104 and 105 and first wires 100 and 101 and the spatial coupling between second wires 110 and 112 and first wires 100 and 101 satisfy a condition of the present embodiment, as shown in FIG. 12, magnetic filter 7-1 may be attached to second wire 111 between second wires 104 and 105 and reactor 8, and magnetic filter 7-2 may be attached between second wires 110 and 112 and external electrode 4.

In addition, when the spatial coupling between third wires 106 and 107 and first wires 100 and 101 satisfies the condition of the present embodiment, magnetic filters 7-3 and 7-4 may be attached to second wires 106 and 107.

Although FIG. 12 illustrates the configuration in which the magnetic filter is attached to each of second wires 106 and 107, second wires 106 and 107 may be wound around one magnetic component (for example, a ring-shaped core), that is, a common mode filter may be used. Similarly, in second wires 110 and 112, second wires 110 and 112 may be wound around one magnetic component.

(1-5) Full-Bridge Converter

Figure 13:
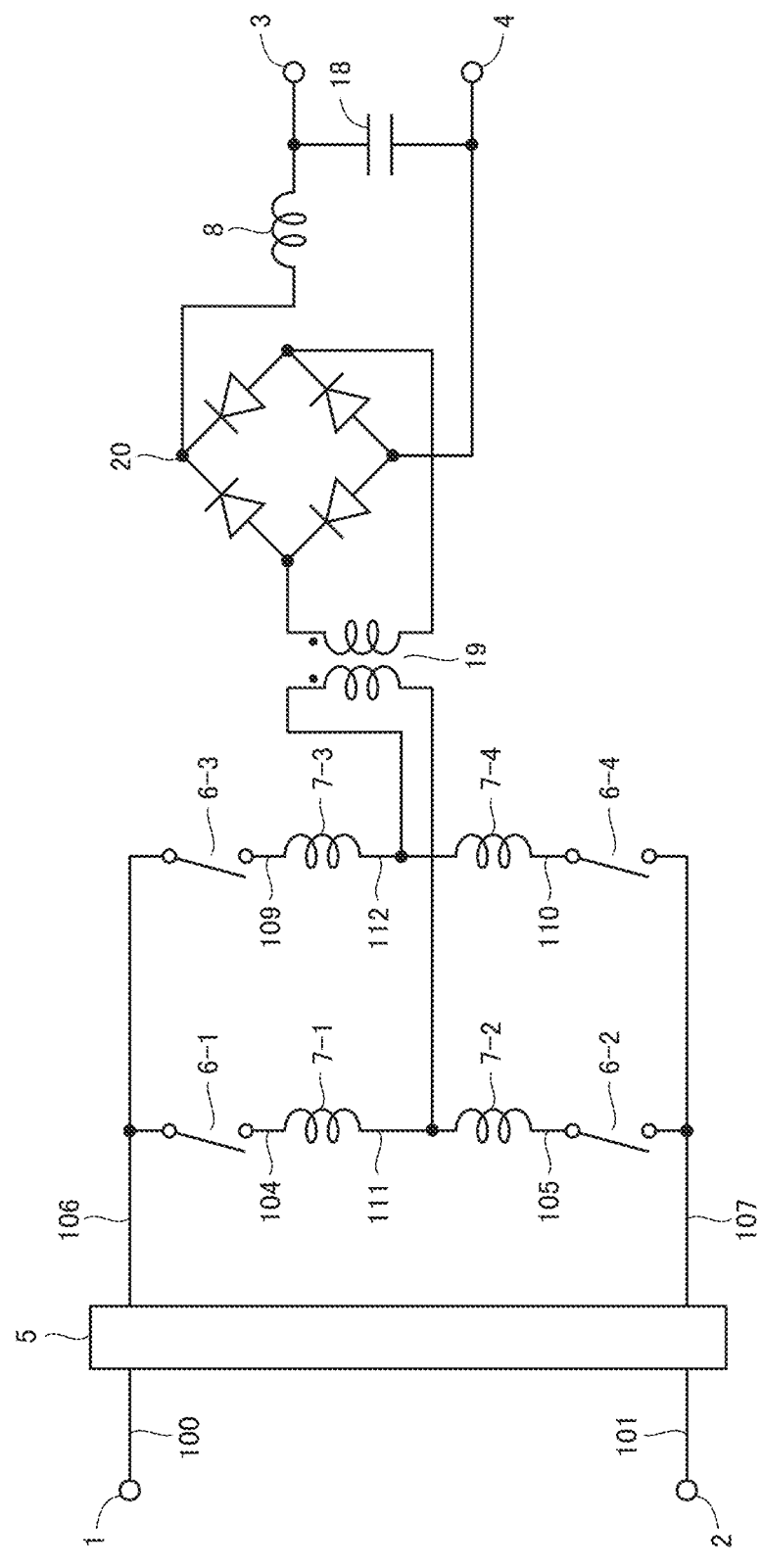
FIG. 13 is a diagram illustrating a configuration example of a full-bridge converter to which the power conversion device according to the first embodiment is applied.

FIG. 13 is a diagram illustrating a configuration example of a full-bridge converter to which the power conversion device according to the first embodiment is applied.

In the full-bridge converter shown in FIG. 13, similarly to the four-quadrant converter shown in FIG. 11, magnetic filters 7-1 to 7-4 are provided for four switching elements 6-1 to 6-4, respectively. The full-bridge converter differs from the four-quadrant converter in that the full-bridge converter has a transformer 19, smoothing capacitor 18, and a diode bridge 20.

Transformer 19 is connected between second wire 111 and second wire 112. Since a primary winding of transformer 19 can be regarded as a reactor, the power conversion device according to the first embodiment can be applied. Diode bridge 20 is connected to a secondary winding of transformer 19. A voltage full-wave rectified by diode bridge 20 is converted into a DC voltage by passing through reactor 8 and smoothing capacitor 18. By using the full-bridge converter, a DC voltage of about several kV can be easily generated.

Although not shown, noise propagated by spatial coupling can be reduced by providing a magnetic filter between the switching element and the reactor in a flyback converter, a forward converter, and the like which are other isolated DC-DC converters. As a result, it is possible to suppress deterioration of the attenuation characteristic of noise filter 5.

<AC-DC Converter>

Figure 14:
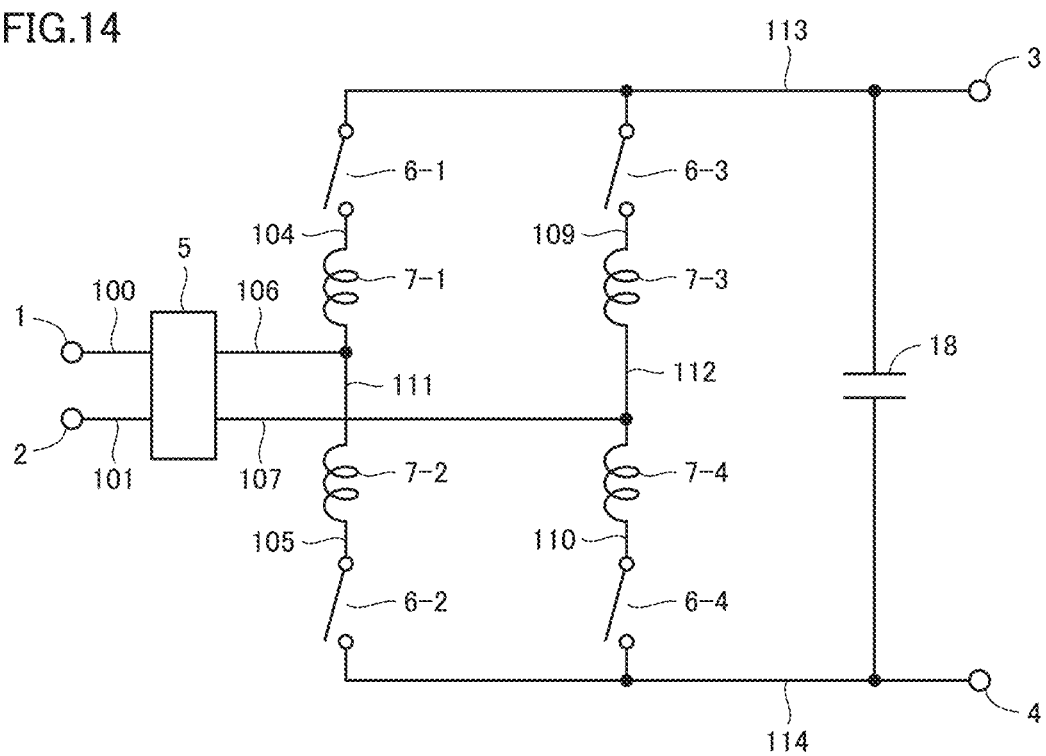
FIG. 14 is a diagram illustrating a first configuration example of an AC-DC converter to which the power conversion device according to the first embodiment is applied.

FIG. 14 is a diagram illustrating a first configuration example of the AC-DC converter to which the power conversion device according to the first embodiment is applied.

Referring to FIG. 14, the AC-DC converter includes four switching elements 6-1 to 6-4. Four magnetic filters 7-1 to 7-4 are provided corresponding to four switching elements 6-1 to 6-4.

Magnetic filters 7-1 to 7-4 can reduce noise propagated by spatial coupling between first wires 100 and 101 and second wires 104, 105, 109, and 110. In particular, when a distance between switching element 6 and corresponding magnetic filter 7 is as short as about several cm, the spatial coupling can be efficiently reduced.

The AC-DC converter is configured by a diode bridge instead of the switching element in some cases. However, a diode bridge is not suitable for a switching circuit through which a large current flows because a loss due to a threshold voltage (resistance component) of a diode is large. Therefore, in a case where a diode is used as a part of the switching element or in a case where a switching element is used as a part of the diode bridge (for example, a totem pole AC-DC converter), the power conversion device according to the first embodiment can be applied.

Figure 15:
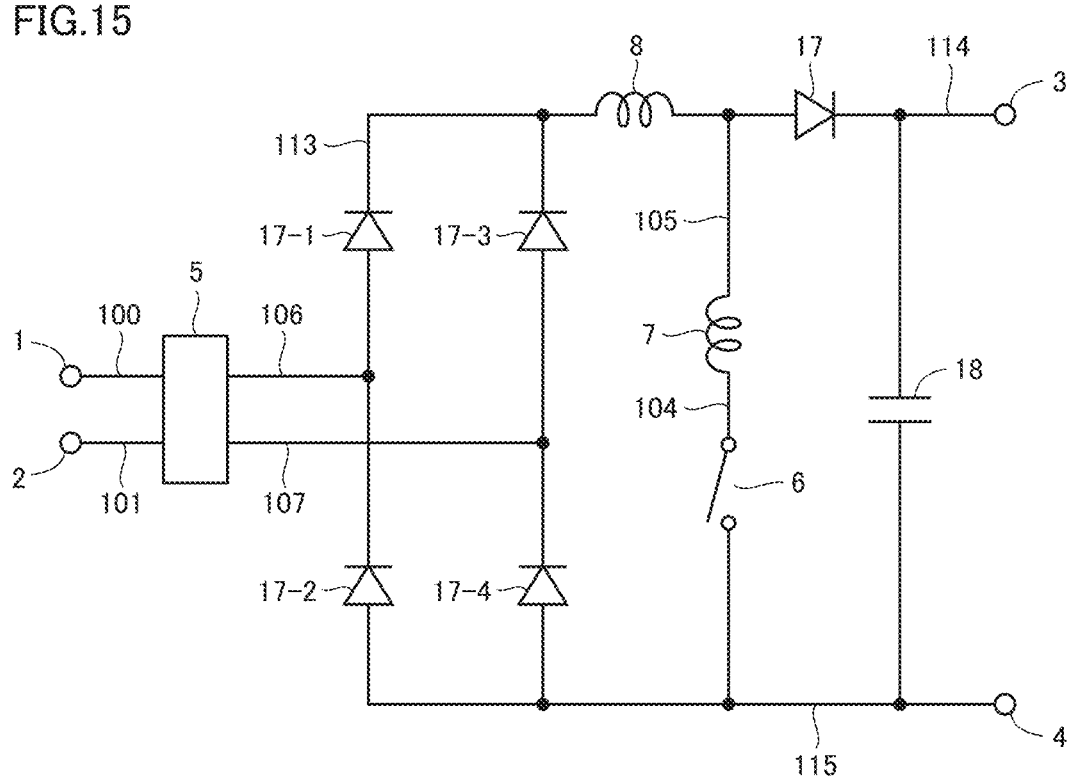
FIG. 15 is a diagram illustrating a second configuration example of the AC-DC converter to which the power conversion device according to the first embodiment is applied.

FIG. 15 is a diagram illustrating a step-up chopper composite rectifier circuit as a second configuration example of the AC-DC converter to which the power conversion device according to the first embodiment is applied.

As illustrated in FIG. 15, the step-up chopper composite rectifier circuit full-wave rectifies an AC voltage by a diode bridge including four diodes 17-1 to 17-4, and then converts the AC voltage into a DC voltage by reactor 8. Further, the DC voltage is stepped up by a step-up circuit including switching element 6, diode 17, and smoothing capacitor 18.

In the example in FIG. 15, magnetic filter 7 is also provided between switching element 6 and reactor 8, and thus the spatial coupling between second wire 104 and first wires 100 and 101 can be reduced. As a result, noise flowing between external electrodes 1 and 2 can be reduced, and deterioration of the attenuation characteristics of noise filter 5 can be suppressed.

<DC-AC Converter>

Figure 16:
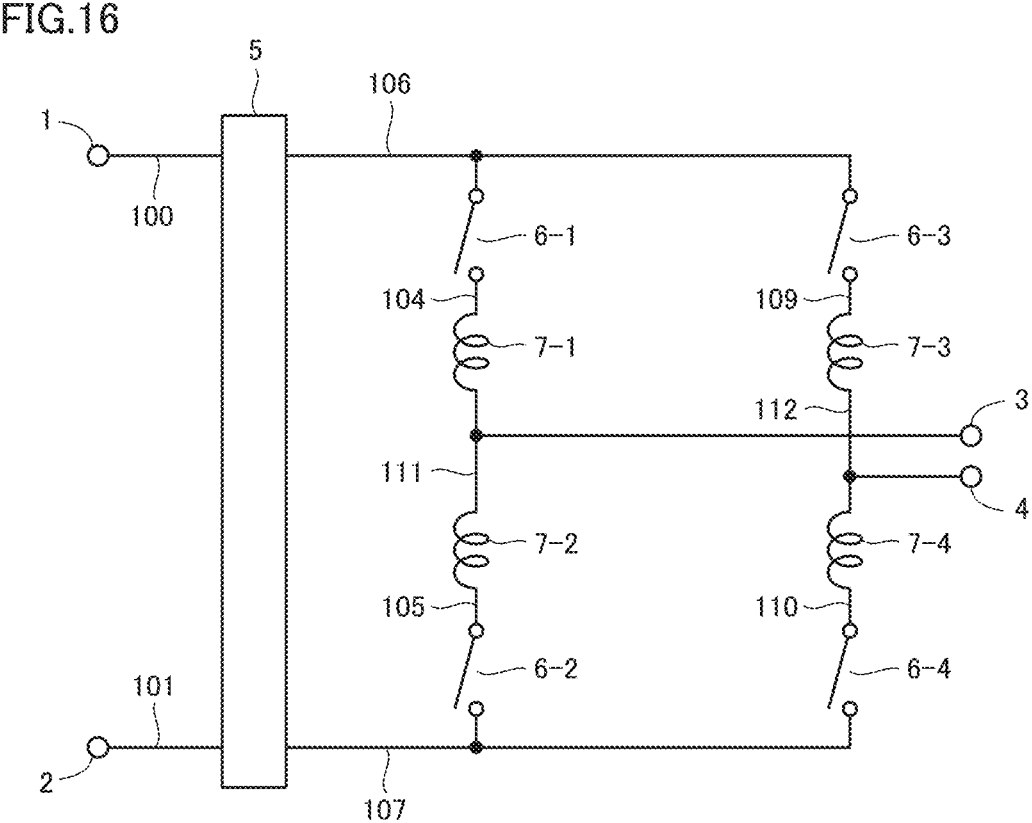
FIG. 16 is a diagram illustrating a first configuration example of a DC-AC converter to which the power conversion device according to the first embodiment is applied.
Figure 17:
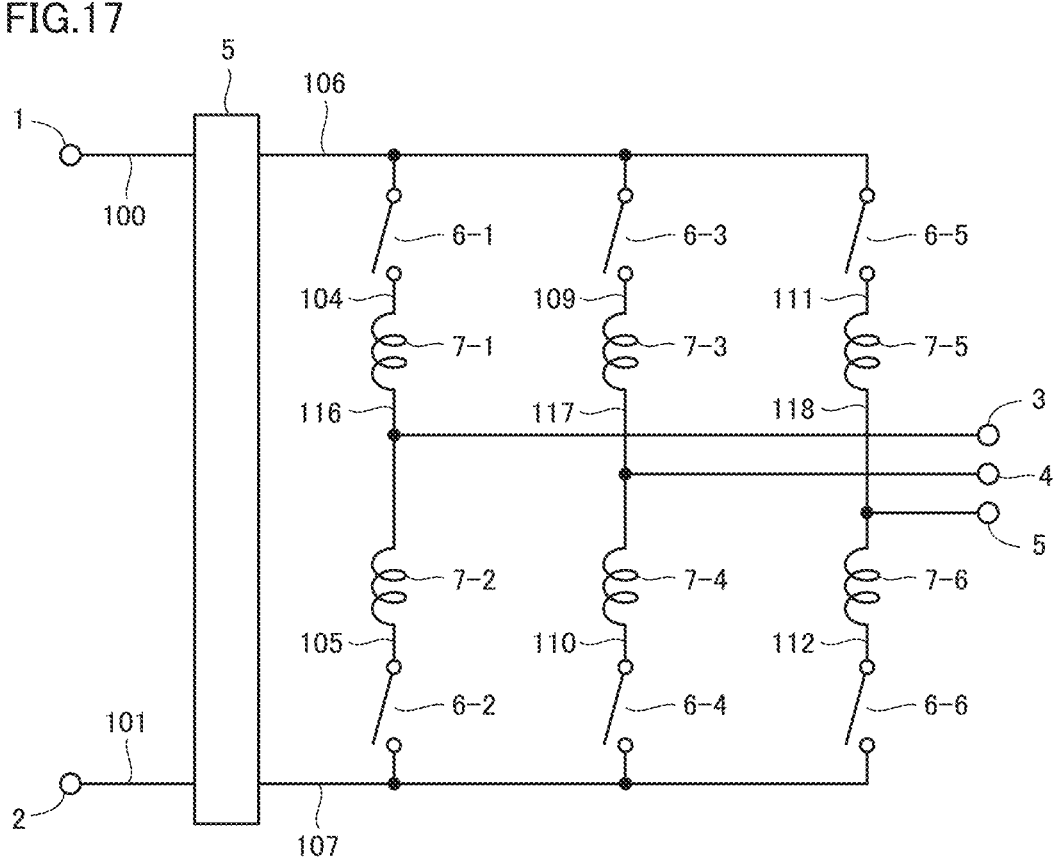
FIG. 17 is a diagram illustrating a second configuration example of the DC-AC converter to which the power conversion device according to the first embodiment is applied.

FIG. 16 is a diagram illustrating a first configuration example of a DC-AC converter to which the power conversion device according to the first embodiment is applied. FIG. 17 is a diagram illustrating a second configuration example of the DC-AC converter to which the power conversion device according to the first embodiment is applied.

FIG. 16 is a configuration example in which the power conversion device according to the first embodiment is applied to a single-phase inverter, and FIG. 17 is a configuration example in which the power conversion device according to the first embodiment is applied to a three-phase inverter. Since there is no difference in how to attach magnetic filter 7 between the single-phase inverter and the three-phase inverter, the first configuration example illustrated in FIG. 16 will be described below.

In the single-phase inverter, similarly to the DC-DC converter, magnetic filters 7-1 to 7-4 are provided in order to reduce the spatial coupling between each of second wires 104, 105, 109, and 110 and first wires 100 and 101.

Without magnetic filter 7, the noise of switching element 6-1 is propagated to external electrode 3 through second wire 104, and returns from external electrode 4 via the load connected between external electrodes 3 and 4. Since the propagation path of noise becomes long as described above, a large amount of spatial coupling is generated with first wires 100 and 101. As a result, as compared with the attenuation characteristic of noise filter 5 alone, the attenuation characteristic in a case where noise filter 5 is connected to switching elements 6-1 to 6-4 is deteriorated.

In the present embodiment, as shown in FIG. 16, by providing magnetic filters 7-1 to 7-4 for switching elements 6-1 to 6-4, respectively, deterioration of the attenuation characteristic of noise filter 5 can be suppressed.

In this case, as in the description of the step-up DC-DC converter, using magnetic filters 7-1 to 7-4 having a large resistance component will decrease the conversion efficiency. In a case where magnetic filters 7-1 to 7-4 having large inductance components are used, the magnetic energy accumulated in magnetic filters 7-1 to 7-4 becomes a voltage source when switching elements 6-1 to 6-4 are turned off. As a result, a counter electromotive force is applied to both ends of switching elements 6-1 to 6-4, and a propagation path of noise due to parasitic capacitances at both ends of switching elements 6-1 to 6-4 is formed. Thus, switching noise is easily generated. Therefore, magnetic filters 7-1 to 7-4 desirably have a small resistance component and hardly hold magnetic energy.

Figure 18:
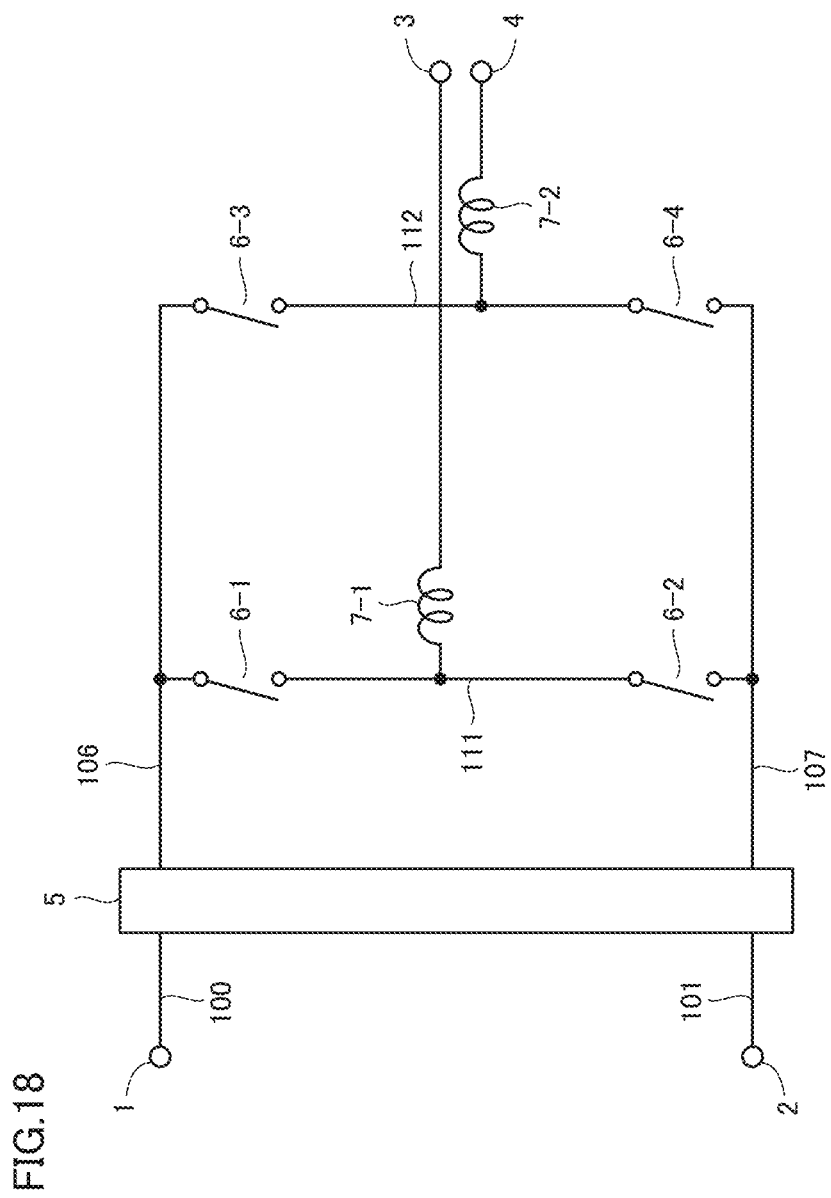
FIG. 18 is a diagram illustrating a third configuration example of the DC-AC converter to which the power conversion device according to the first embodiment is applied.

Instead of attaching the magnetic filter near each switching element, as shown in FIG. 18, as long as the spatial coupling in the present embodiment is satisfied, magnetic filters 7-1 and 7-2 may be attached to second wires 111 and 112, respectively. As a result, the number of magnetic filters can be reduced.

Figure 19:
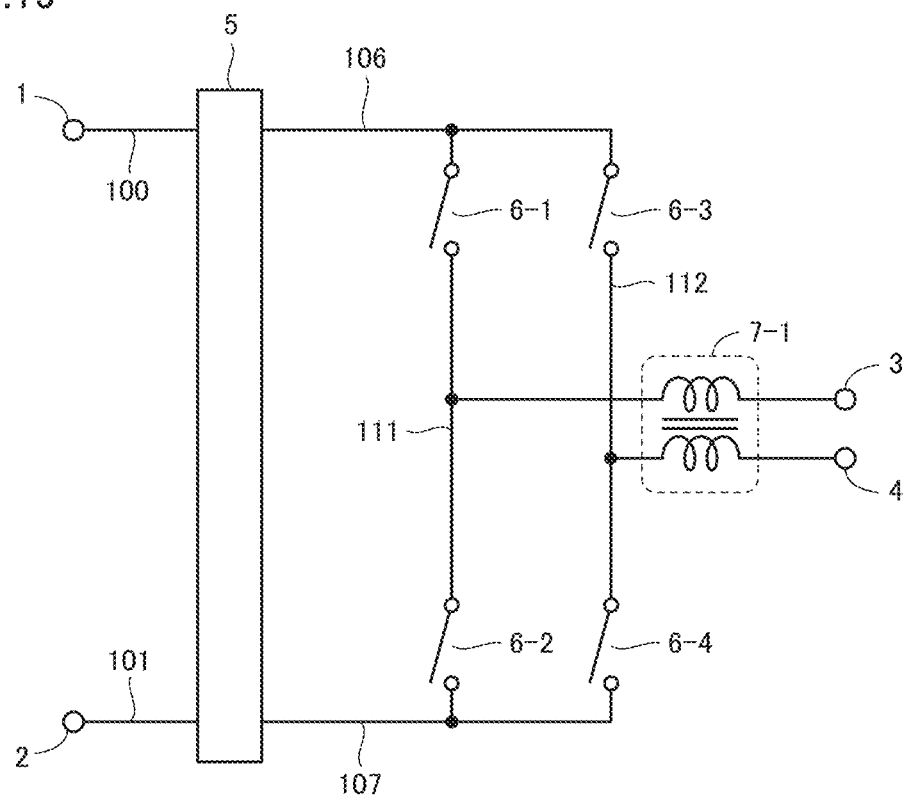
FIG. 19 is a diagram illustrating a fourth configuration example of the DC-AC converter to which the power conversion device according to the first embodiment is applied.

As shown in FIG. 19, instead of magnetic filters 7-1 and 7-2 shown in FIG. 18, second wires 111 and 112 may be wound around one magnetic filter 7-1.

Figure 20:
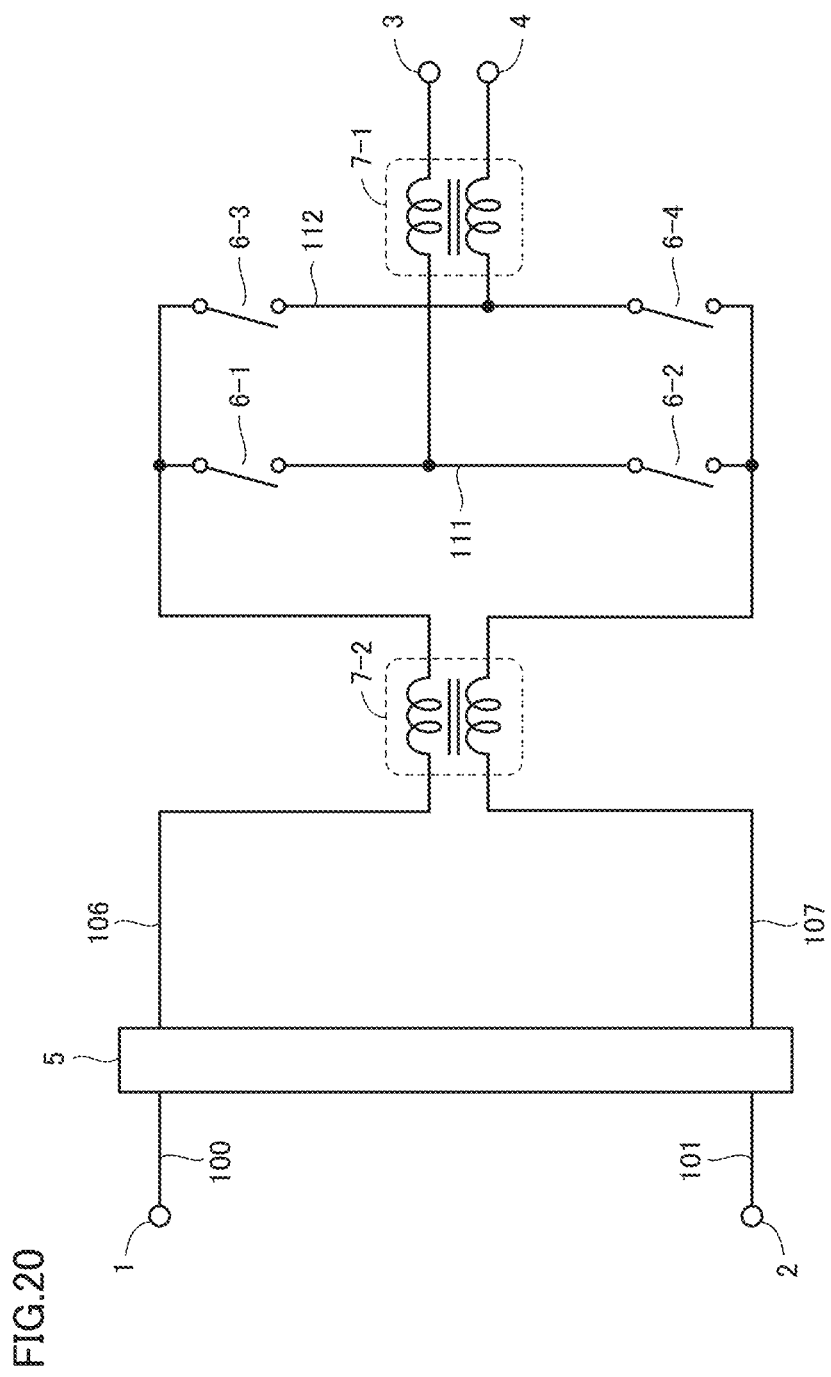
FIG. 20 is a diagram illustrating a fifth configuration example of the DC-AC converter to which the power conversion device according to the first embodiment is applied.

Alternatively, as shown in FIG. 20, in addition to magnetic filter 7-1 shown in FIG. 19, magnetic filter 7-2 may be provided between switching elements 6-1 to 6-4 and noise filter 5 so as to satisfy the spatial coupling in the present embodiment. Although magnetic filter 7-2 is described as a common mode filter in which third wires 106 and 107 is passed through one magnetic filter, the magnetic filter may be divided and attached to each of third wires 106 and 107 as a normal mode filter as in other examples.

<AC-AC Converter>

Although not shown, the power conversion device according to the first embodiment can also be applied to an AC-AC converter. Examples of the AC-AC converter include a cycloconverter and a matrix converter. Since the switching element is also used in such converters, the spatial coupling can be reduced by providing the magnetic filter close to the switching element, and as a result, the attenuation characteristic of noise filter 5 can be improved.

<Mutual Inductance>

Next, spatial coupling by magnetic field coupling between two wires will be described.

When a current flows through a wire, a magnetic field proportional to the amplitude of the current is formed around the wire in accordance with Biot-Savart law. When a current I flowing through the wire is an alternating current including noise, a magnetic field is generated by electromagnetic induction due to a temporal change. Then, the magnetic field induces an electromotive force V in the wire in accordance with Lenz's law. The phenomenon of generating electromotive force V in the wire through which current I flows is referred to as self-induction. The phenomenon of generating electromotive force V in a wire around the wire through which current I flows is referred to as mutual induction. Inductance due to self-induction is referred to as self-inductance, and inductance due to mutual induction is referred to as mutual inductance.

Figure 21:
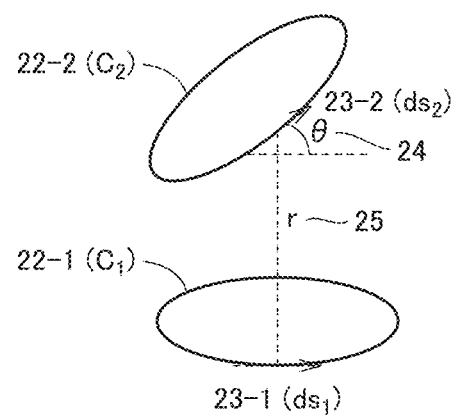
FIG. 21 is a diagram for describing mutual inductance between two wires.

In the first embodiment, a method of reducing spatial propagation of noise caused by mutual inductance will be described. Mutual inductance due to magnetic coupling between two closed magnetic paths (closed circuits) 22-1 and 22-2 will be described with reference to FIG. 21. The magnetic coupling in the present embodiment means mutual inductance.

Neumann's formula is used to derive the mutual inductance. Assuming that the mutual inductance is M, mutual inductance M is represented by the following equation (1).

[Equation 1]

$$M = \frac{\mu_r \mu_0}{4\pi} \oint_{c_1} \oint_{c_2} \frac{\cos\theta ds_1 ds_2}{r} \quad (1)$$

When mutual inductance M is obtained, and the current flowing through wire 22-1 is I1, induced electromotive force V generated in wire 22-2 by the mutual induction can be represented by the following formula (2).

[Equation 2]

$$V = M \frac{dI_1}{dt} \quad (2)$$

In equation (2), d represents a minute amount, dt represents a minute time, and dI1/dt represents a change in current in the minute time. This change in the current can be considered as a temporal change in a noise current.

Figure 22:
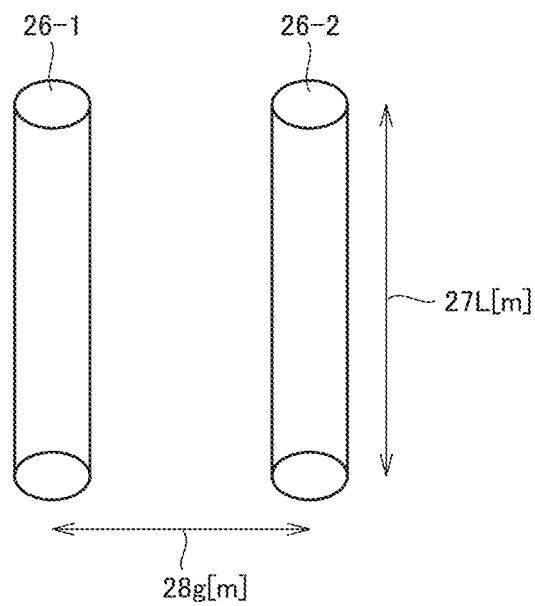
FIG. 22 is a diagram for describing magnetic coupling between two cables.

FIG. 22 is a diagram for describing magnetic coupling between two cables 26-1 and 26-2. Mutual inductance M due to the magnetic coupling between cables 26-1 and 26-2 can be derived by equation (1). Cables 26-1 and 26-2 represent first wires 100 and 101 and second wire 103, respectively, in the power conversion device according to the first embodiment.

When a center-to-center distance 28 of cables 26-1 and 26-2 is g [m] and a length 27 of each cable is L [m], mutual inductance M can be represented by the following equation (3).

[Equation 3]

$$M = \frac{\mu_r \mu_0}{4\pi} \left\{ L \times \log \frac{L + \sqrt{g^2 + L^2}}{g} - \sqrt{g^2 + L^2} + g \right\} \quad (3)$$

<Induced Voltage by Magnetic Field Coupling>

Induced electromotive force V due to self-induction can be represented by V=L·dI/dt where I is a current flowing through the wire and L is a self-inductance. Induced electromotive force V due to the mutual induction can be represented by V=M·dI/dt where the mutual inductance is M.

As described above, when a temporal change dI/dt of a current (including the noise component) flowing through a wire is not 0, by the noise current flowing through one wire, a noise voltage is generated in the conductor including a wire around the one wire. The noise voltage further forms a circuit via a conductor or a space, and generates a noise current by impedance of the circuit.

In the first embodiment, by reducing the magnetic field coupling between second wire 103 between switching element 6 and reactor 8 and first wires 100 and 101 between external electrodes 1 and 2 and noise filter 5, the noise current flowing through the second wire is prevented from being mixed into the first wires. In this way, designing the positions of noise filter 5 and magnetic filter 7 and the routing of the wires in consideration of the magnetic field coupling between the wires is a concept not seen in the prior art.

In order to reduce magnetic field coupling, in the power conversion device according to the first embodiment, magnetic filter 7 is provided in second wire 103 connecting switching element 6 and reactor 8 so as to be close to switching element 6. Furthermore, a wire distance between second wire 103 and first wires 100 and 101 connecting external electrodes 1 and 2 and noise filter 5 is increased.

Theoretically, by increasing the wire distance, a propagation amount of noise due to magnetic field coupling is reduced. However, in an actual design, mutual inductance M is designed such that the attenuation characteristic of noise propagating in the space due to magnetic field coupling becomes smaller than the attenuation characteristic of noise filter 5.

<Parasitic Capacitance and Stray Capacitance>

A parasitic capacitance (also referred to as stray capacitance) is always generated between two or more conductors. In the present embodiment, two conductors are considered for simplicity.

The parasitic capacitance generated between the two conductors is generated by the same principle as a principle of a capacitor. That is, the parasitic capacitance is given by C=εS/d, where C is the parasitic capacitance. Here, ε is a permittivity, S is a facing area of the two conductors, and d is a distance between the two conductors.

When a potential difference generated between the two conductors is V, a charge Q stored in a space between the conductors by parasitic capacitance C is Q=CV. A Q component is generated in a first conductor, and a −Q component is generated in a second conductor. When noise is superimposed on the conductor, potential difference V changes over time, and thus a first derivative dV/dt of potential difference V has a value that is not 0. Under the condition that C is constant, dQ/dt=C·dV/dt is established. Since dQ/dt=I, it can be seen that a noise current represented by I=C·dV/dt flows from the first conductor to the second conductor.

Note that parasitic capacitance C does not change unless the shape or permittivity of each conductor changes, and even if the shape or permittivity changes, an amount of the change is smaller than dQ/dt, which is enough to be ignored. Therefore, C can be considered to be constant.

When a large voltage is applied between the two conductors by the load, the influence of electric field coupling cannot be ignored. In a system to which a large voltage is applied, the connector also becomes large. As a result, a distance between switching element 6 or reactor 8 and the connector is short in some cases. In such a system, it is necessary to consider not only magnetic field coupling but also electric field coupling. As a countermeasure, the connector is disposed at a position spaced apart from switching element 6 or reactor 8. This reduces an amount of noise current mixed due to electric field coupling between the connector and switching element 6 or reactor 8.

<Description with Actual Device>

Next, a result of verifying the effect of the power conversion device according to the first embodiment with an actual device will be described.

Figure 23:
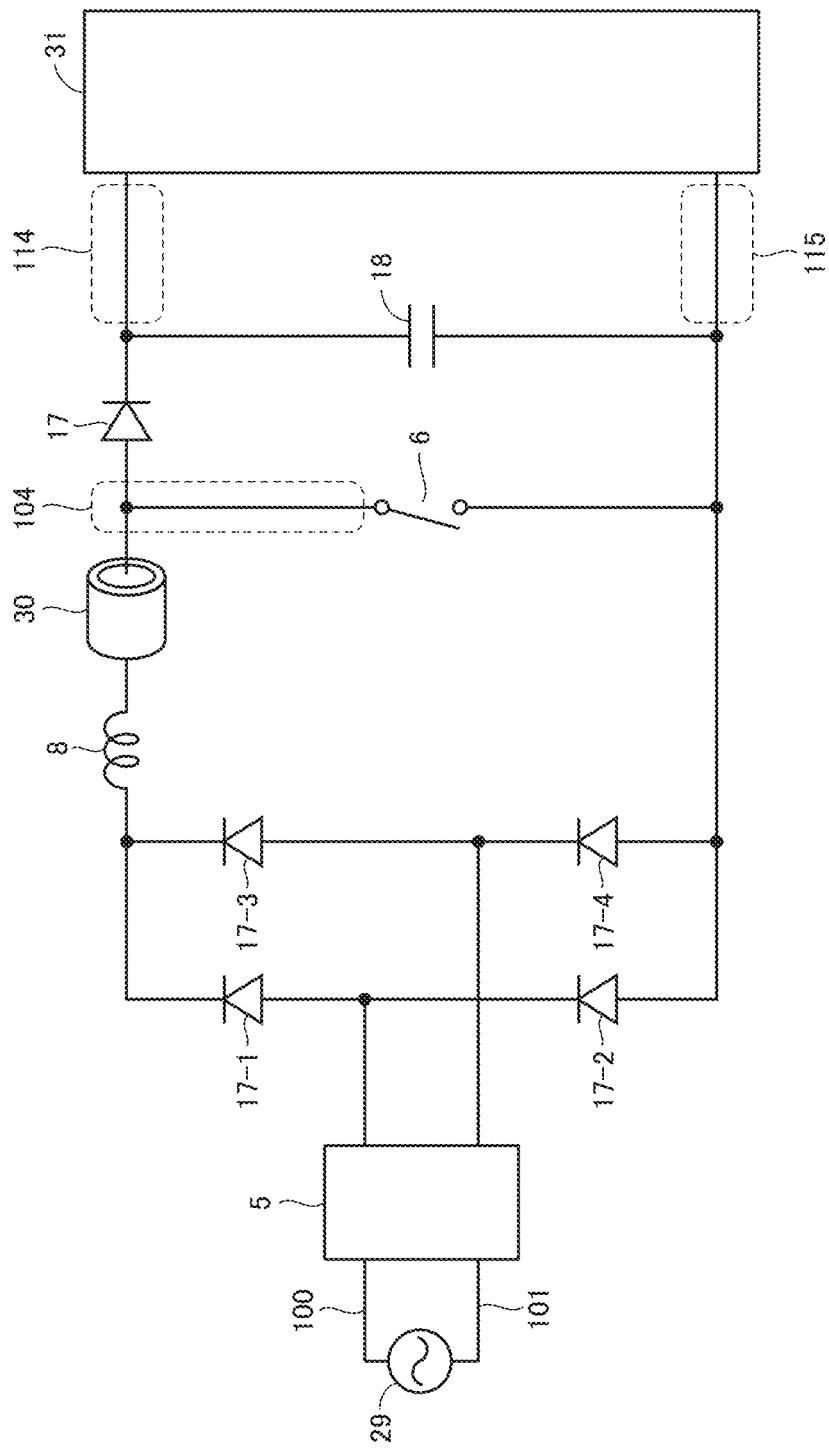
FIG. 23 is a diagram illustrating a configuration example of a power conversion device on which a noise filter is mounted.

FIG. 23 is a diagram illustrating a configuration example of the power conversion device on which noise filter 5 illustrated in FIG. 5 is mounted. In the example in FIG. 23, noise filter 5 is configured by combining an interline capacitor, a ground capacitor, a common mode choke coil, a normal mode choke coil, a diode, a resistor, and a plurality of antistatic components such as a varistor or an arrester. The ground capacitor is attached to a housing of the power conversion device. When there is no housing, the ground capacitor is attached to a location at which the potential becomes a reference potential.

Figure 24:
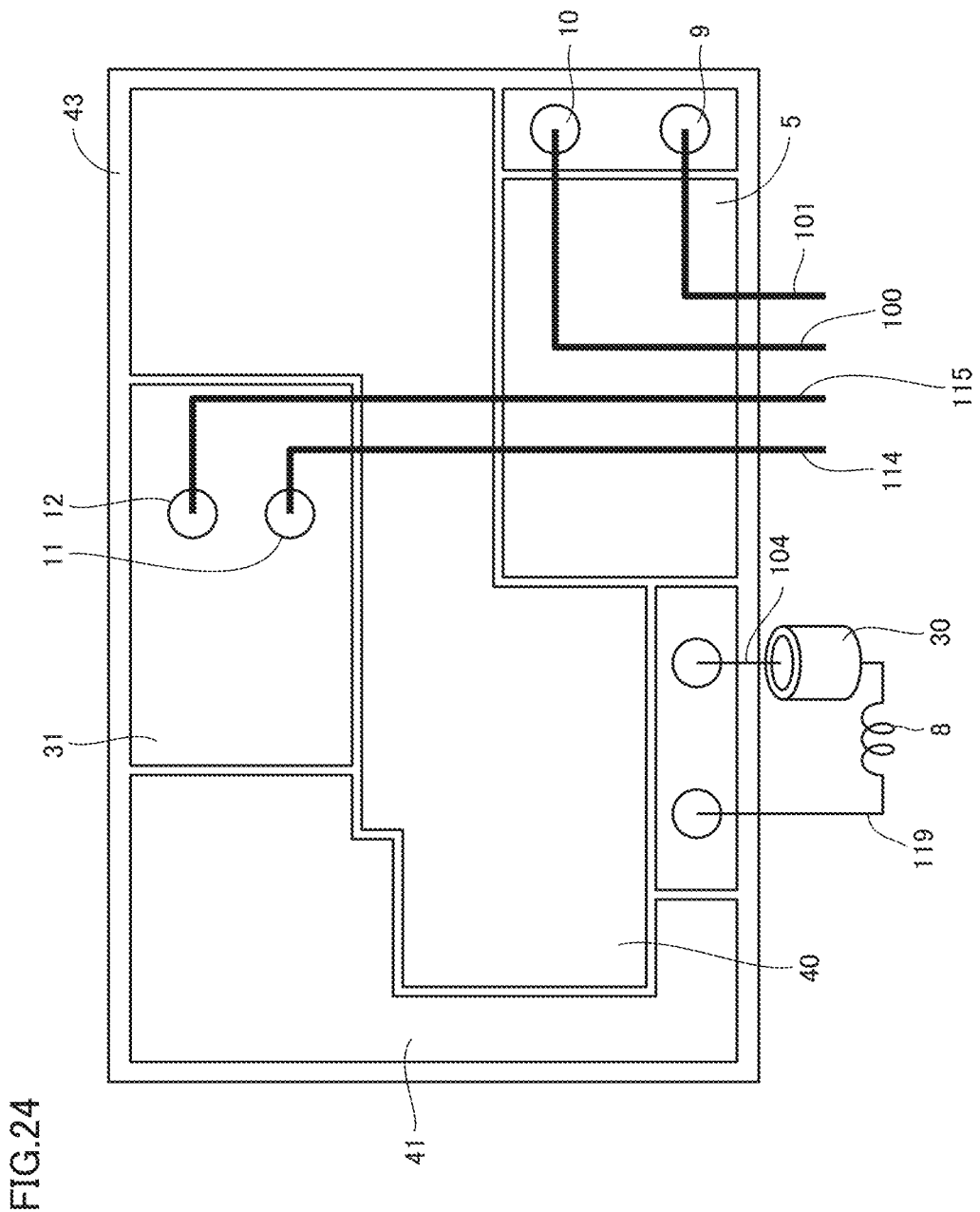
FIG. 24 is a plan view illustrating a first example in which the power conversion device according to the first embodiment is mounted on a printed circuit board.

FIG. 24 is a plan view illustrating a first example in which the power conversion device according to the first embodiment is mounted on the printed circuit board. In the example in FIG. 24, noise filter 5, a converter circuit 40, reactor 8, an inverter circuit 31, and a control circuit 41 are mounted on a printed circuit board 43. Switching element 6 is mounted on converter circuit 40. Reactor 8 and printed circuit board 43 are connected by second wire 104. A ferrite core 30 is mounted as magnetic filter 7 on second wire 104.

First wires 100 and 101 for connecting an external power supply to external electrodes 9 and 10 are mounted on printed circuit board 43. In order to reduce the magnetic field coupling between first wires 100 and 101 and second wire 104, a position of ferrite core 30 and/or routing of first wires 100 and 101 and second wire 104 are designed.

Third wires 114 and 115 are connected to output terminals 11 and 12 of inverter circuit 31, respectively. A load (not shown) is connected to third wires 114 and 115.

Figure 25:
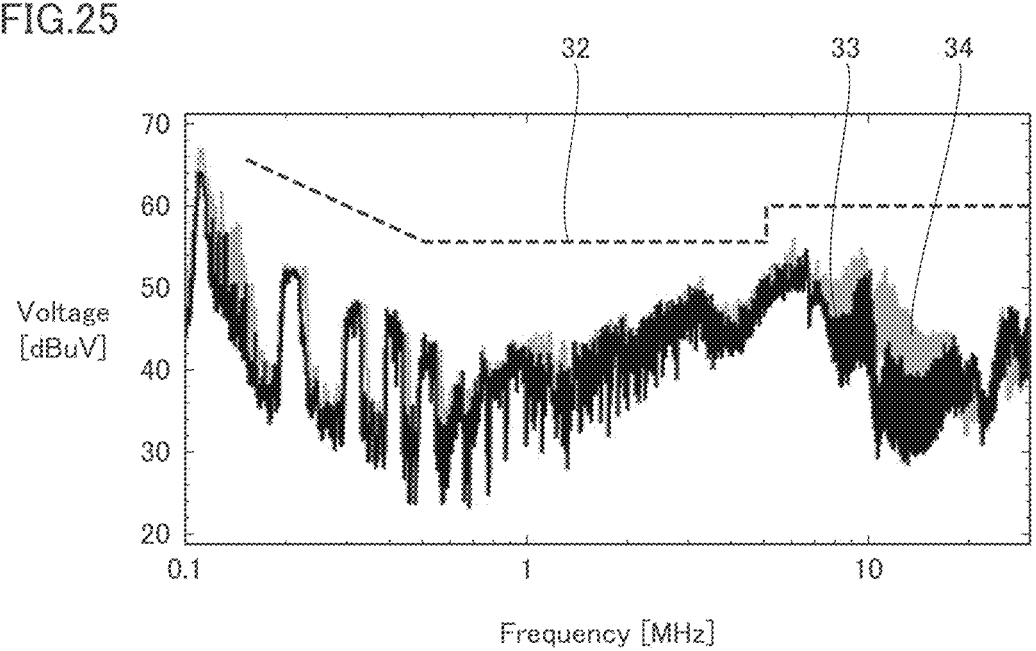
FIG. 25 is a diagram illustrating a measurement result of a noise terminal voltage in the power conversion device according to the first embodiment.

FIG. 25 is a diagram illustrating a measurement result of a noise terminal voltage in the power conversion device according to the first embodiment illustrated in FIGS. 23 and 24. In FIG. 25, a horizontal axis represents the frequency, and a vertical axis represents the noise terminal voltage. Test conditions are in accordance with CISPR 14. Note that ferrite core 30 is used as magnetic filter 7.

In order to confirm the effect of the first embodiment, in the example in FIG. 24, a distance between each of first wires 100 and 101 and second wire 104 is increased to 50 cm from an initial value of 30 cm. Further, a distance between ferrite core 30 and switching element 6 of converter circuit 40 is reduced to 10 cm from an initial value of 30 cm.

Non-split toroidal type ferrite is used as ferrite core 30. Impedance Z of the ferrite is Z=139 Ω at 30 Hz, Z=164 Ω at 50 MHz, and Z=197 Ω at 100 MHz. The ferrite is wound twice around second wire 104 by bifilar winding.

In FIG. 25, a waveform 33 indicates a measurement result of the noise terminal voltage of the power conversion device according to the first embodiment, and a waveform 34 indicates a measurement result of the noise terminal voltage of the power conversion device in an initial state. A waveform 32 indicates a limit value of a standard specified in CISPR 14.

According to the measurement result in FIG. 25, it can be seen that an effect of 10 dB or more appears in a range of 7 MHz to 20 MHz. On the other hand, no effect is observed in ranges of 0.1 MHz to 7 MHz and 20 MHz to 30 MHz. This is because a noise component generated by a device other than the power conversion device is measured in the frequency ranges.

In the example in FIG. 24, a GaN power semiconductor element is used as switching element 6. Therefore, resonance occurs around 10 MHz due to the influence of the size of the housing, the inductance of reactor 8, the parasitic capacitance between reactor 8 and the housing, and the like.

In recent years, with an increase in speed of switching element 6, noise in a 10 MHz band has been likely to occur. For the noise in the 10 MHz band, it is difficult to obtain a noise reduction effect even by using a conventional multi-stage circuit in which a plurality of noise filters are combined, a common mode choke coil, or a normal mode choke coil. This is because a large amount of noise propagating to the outside of the power conversion device without passing through the noise filter is generated by spatial coupling. In the first embodiment, as described above, since the spatial coupling is reduced by the installation of magnetic filter 7 and the design of the wire distance, noise propagated to the outside of the power conversion device without passing through noise filter 5 can be reduced.

Figure 26:
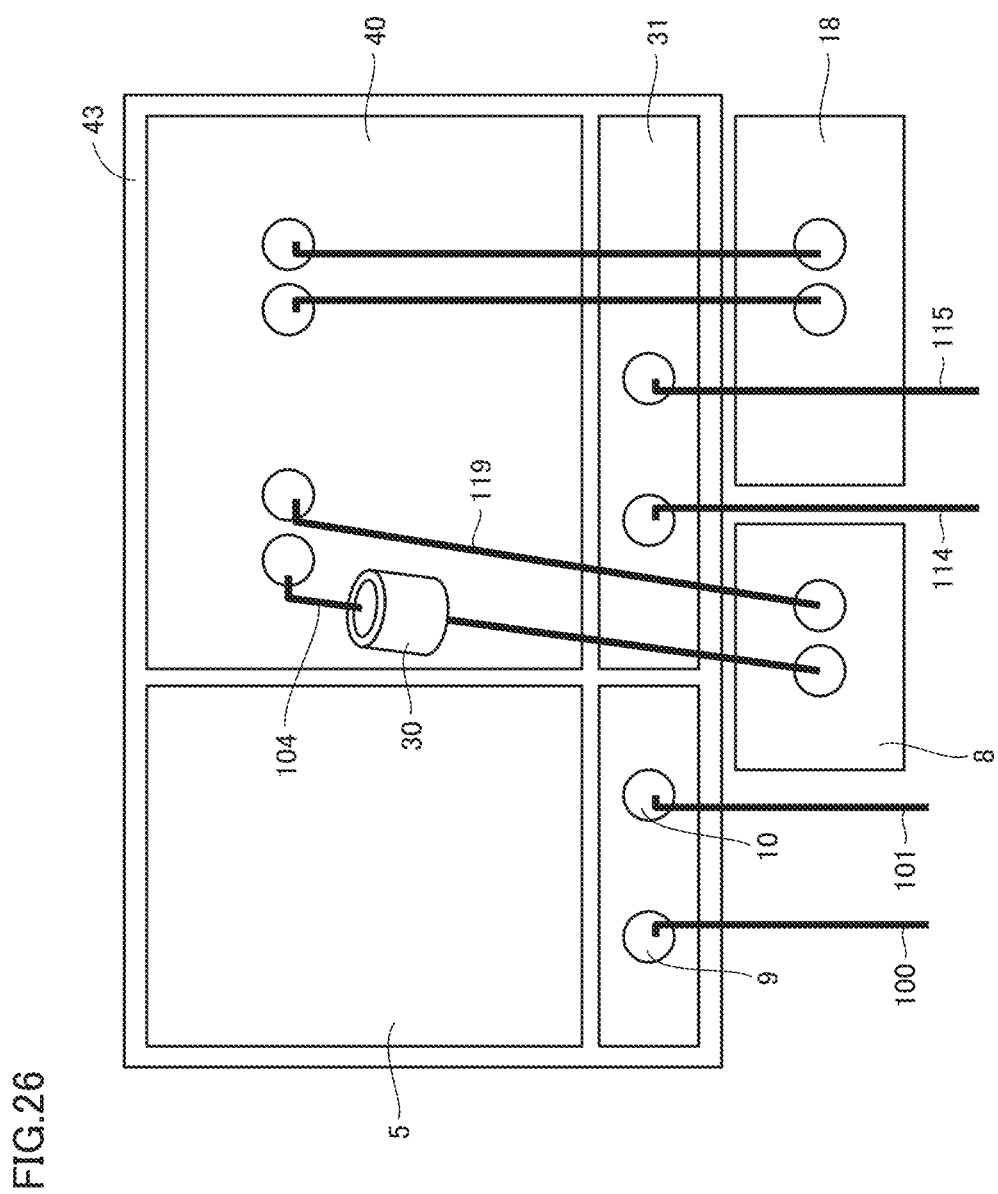
FIG. 26 is a plan view illustrating a second example in which the power conversion device according to the first embodiment is mounted on the printed circuit board.

FIG. 26 is a plan view illustrating a second example in which the power conversion device according to the first embodiment is mounted on the printed circuit board. In the example in FIG. 26, noise filter 5, inverter circuit 31, converter circuit 40, reactor 8, and smoothing capacitor 18 are mounted on printed circuit board 43. First wires 100 and 101 are connected between an external AC power supply and noise filter 5. Power from the AC power supply is supplied to inverter circuit 31 via noise filter 5. Inverter circuit 31 converts AC power into DC power and outputs the DC power. Converter circuit 40 converts the DC power into AC power of an arbitrary frequency and supplies the AC power to the load via third wires 114 and 115.

In the configuration in FIG. 26, reactor 8 and smoothing capacitor 18 are mounted on a printed circuit board different from printed circuit board 43 in consideration of weights and heat generation of reactor 8 and smoothing capacitor 18. Converter circuit 40 is connected to reactor 8 by second wires 104 and 119 and is connected to the board on which smoothing capacitor 18 is mounted by the wires. With such wiring, magnetic coupling can be also controlled by bringing ferrite core 30 as magnetic filter 7 close to converter circuit 40.

Note that noise filter 5 and converter circuit 40 are mounted on an upper surface of printed circuit board 43, and reactor 8 and smoothing capacitor 18 are disposed below printed circuit board 43. This configuration is intended to prevent reactor 8 and smoothing capacitor 18, which are vulnerable to heat, from being warmed because warm air flows upward, and to reduce the inductance value of reactor 8 due to heat or extend the life of the smoothing capacitor. It is therefore difficult to arrange these components apart from first wires 100 and 101.

Although usually connected via a terminal block, first wires 100 and 101 are arranged close to the ground which is less likely to be directly exposed to rain since being exposed to water droplets such as rain will increase a possibility of short circuit or corrosion. It is therefore difficult to arrange first wires 100 and 101 apart from reactor 8 and smoothing capacitor 18.

Thus, in the first embodiment, ferrite core 30 is attached to second wire 104 to remove noise due to magnetic coupling, and improve an apparent characteristic of noise filter 5. In the example in FIG. 26, ferrite core 30 is attached only to second wire 104, but second wire 104 and second wire 119 may be wound around one ferrite core 30. When the frequency is less than or equal to 100 MHz, the effect of ferrite core 30 can be enhanced by winding not only one turn but also a plurality of turns. On the other hand, when the frequency is greater than or equal to 100 MHz, by winding the wires around ferrite core 30 a plurality of times, the electric field coupling between the wound wires is increased, and the apparent characteristic of ferrite core 30 is deteriorated. It is therefore desirable to wind the wires about one to three turns.

Second Embodiment

In a second embodiment, a normal mode noise and a common mode noise will be described.

<Normal Mode>

The normal mode noise refers to a noise in a state where a switching element as a noise source is connected in series to a power supply line, and the noise flows as a current along the same direction as a power supply current. Since forward and return phases of the current are opposite (phases are different by 180 degrees), the normal mode noise is also referred to as a normal mode or a differential mode.

<Common Mode>

The common mode noise is also called a common mode because currents flowing in the same direction as the power supply line are in a common phase (phases coincide).

In the case of a single-phase power supply line, the current is a current caused by a noise source flowing in the same phase, and the common mode noise returns to the noise source via a stray capacitance between the housing and the printed circuit board, a stray capacitance between the housing and the rotary machine, a ground capacitor, or the like.

<Characteristic of Noise Filter for Normal Mode and Common Mode>

In the second embodiment, a value of B is determined by a structural design to satisfy B<C, where the attenuation characteristic by propagation of noise by spatial coupling described in the first embodiment, that is, propagation in space is B, and the attenuation characteristic of noise filter 5 for the common mode is C.

Figure 27:
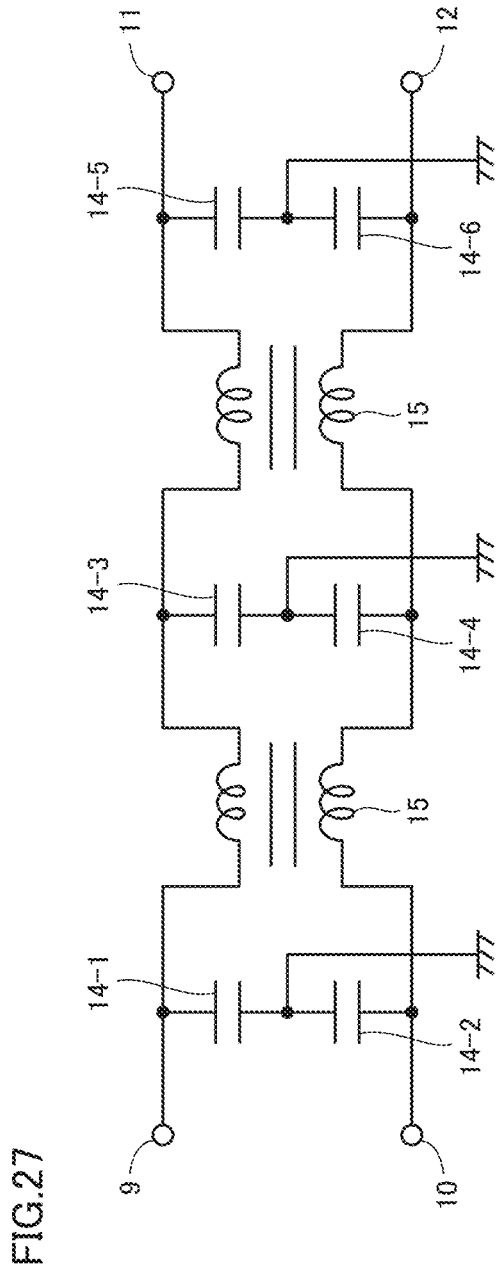
FIG. 27 is a circuit diagram illustrating components affecting a common mode component extracted from a noise filter.

FIG. 27 is a circuit diagram illustrating components affecting a common mode component extracted from noise filter 5 illustrated in FIG. 5. Components that do not affect the common mode component, such as the interline capacitor and the normal mode choke coil, can be considered to be removed.

Figure 28:
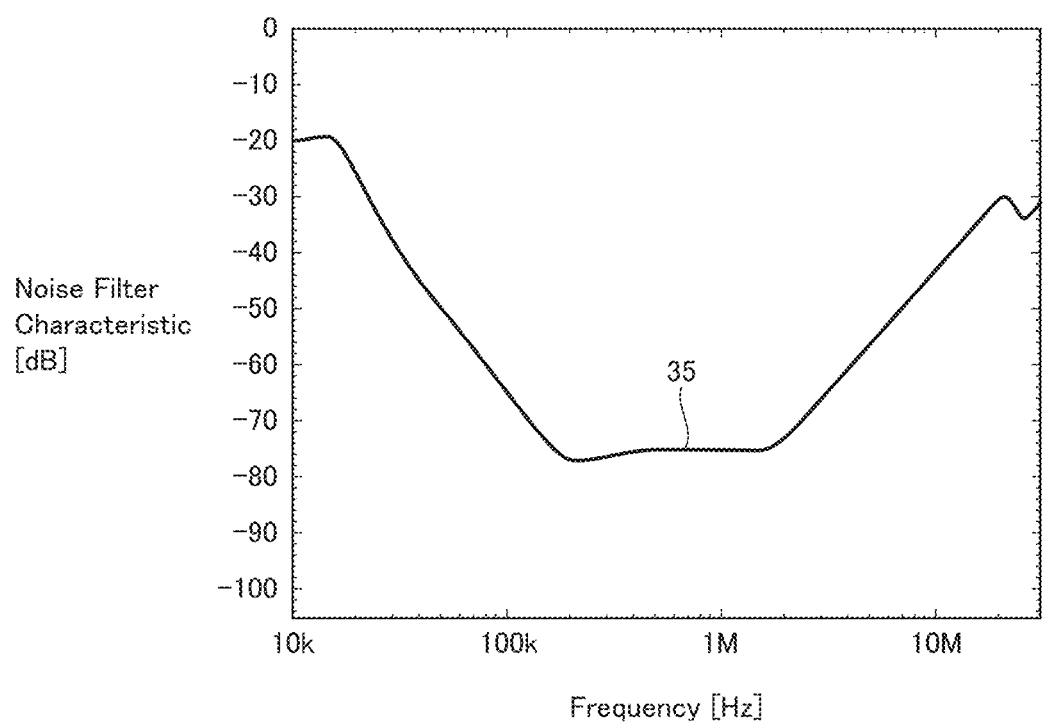
FIG. 28 is a diagram illustrating a measurement result of an attenuation characteristic for a common mode of the noise filter illustrated in FIG. 27.

FIG. 28 is a diagram illustrating a measurement result of the attenuation characteristic for the common mode of the noise filter illustrated in FIG. 27. In FIG. 28, a horizontal axis represents the frequency, and a vertical axis represents the attenuation characteristic. As illustrated in a waveform 35 in FIG. 28, for example, at 1 MHz, the attenuation characteristic for the common mode noise of −75 dB is obtained.

Note that a vector network analyzer or an impedance analyzer can be used to measure the noise filter. In the measurement in FIG. 28, a vector network analyzer (product name: E5061B, manufactured by Keysight Technologies) is used.

Figure 29:
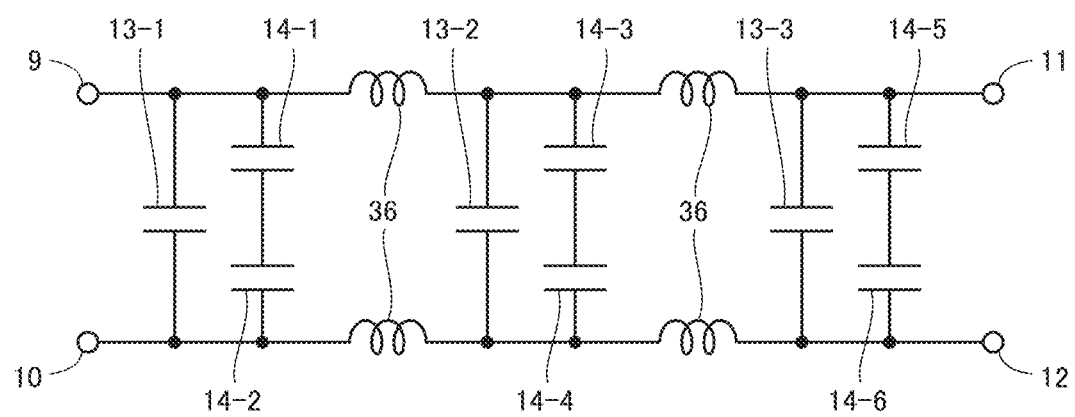
FIG. 29 is a circuit diagram illustrating components affecting a normal mode component extracted from a noise filter.

FIG. 29 is a circuit diagram illustrating components affecting the normal mode component extracted from noise filter 5 in FIG. 5. Although the interline capacitor and the normal mode choke coil are effective in the normal mode, a leakage inductance component of the common mode choke coil and the ground capacitor are series capacitors, and thus can be regarded as interline capacitors.

Figure 30:
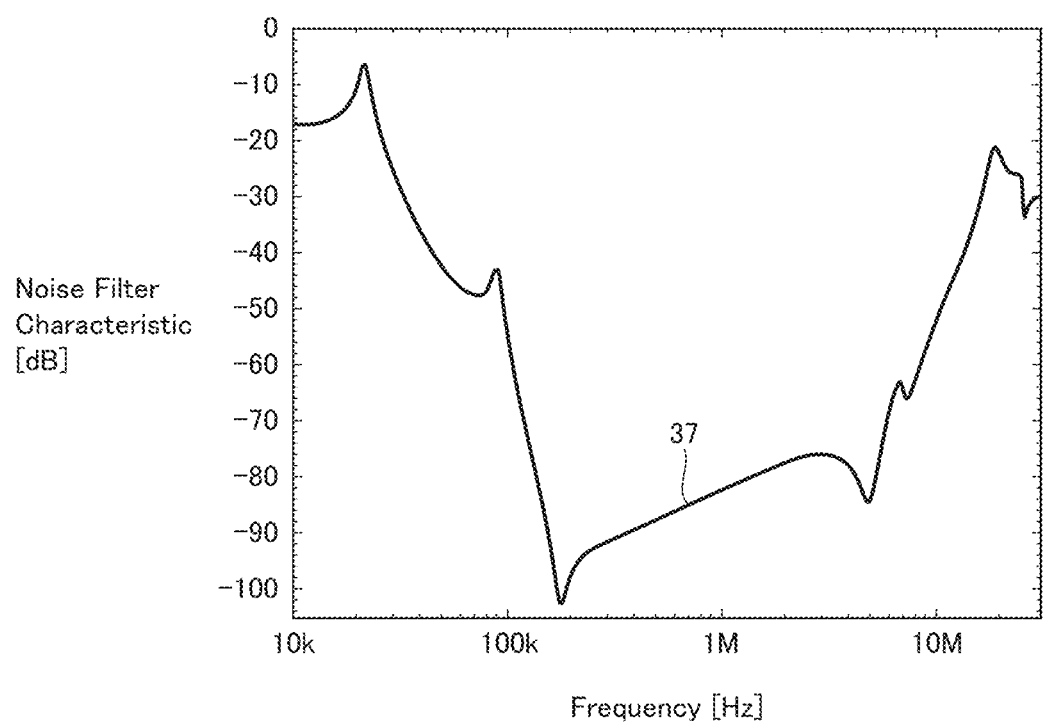
FIG. 30 is a diagram illustrating a measurement result of an attenuation characteristic for a normal mode of the noise filter illustrated in FIG. 29.

FIG. 30 is a diagram illustrating a measurement result of the attenuation characteristic for the normal mode of the noise filter illustrated in FIG. 29. In FIG. 30, a horizontal axis represents the frequency, and a vertical axis represents the attenuation characteristic. As illustrated in a waveform 37 in FIG. 30, for example, at 1 MHz, the attenuation characteristic for the normal mode noise of −82 dB is obtained.

<Propagation of Noise by Spatial Coupling>

First wires 100 and 101 are usually accompanied within several cm in proximity. This is because first wires 100 and 101 are often bundled and disposed in a device for ease of manufacturing, and first wires 100 and 100 are often fixed to a protrusion provided in the device.

However, in a case where noise propagates by spatial coupling as described in the first embodiment, it is easy to obtain the same magnetic coupling as in a state where first wires 100 and 101 are closely accompanied. In particular, in a case where the magnetic coupling is equal between two wires, an induced voltage is uniformly generated for the two wires, and thus a common mode component as a common phase component is dominant. Therefore, propagation of noise by spatial coupling easily generates a common mode noise.

On the other hand, the normal mode noise is generated due to a difference in wiring length of the cable or a difference in impedance (for example, impedance of noise filter 5) between both ends of first wires 100 and 101. The normal mode noise can also occur by changing from the common mode noise to the normal mode noise due to a phase shift of first wires 100 and 101. In addition, when a distance between first wire 100 and second wire 104 is different from a distance between first wire 101 and second wire 104, or when directions of first wire 100 and second wire 104 are different from directions of first wire 101 and second wire 104, the normal mode noise increases.

Figure 31:
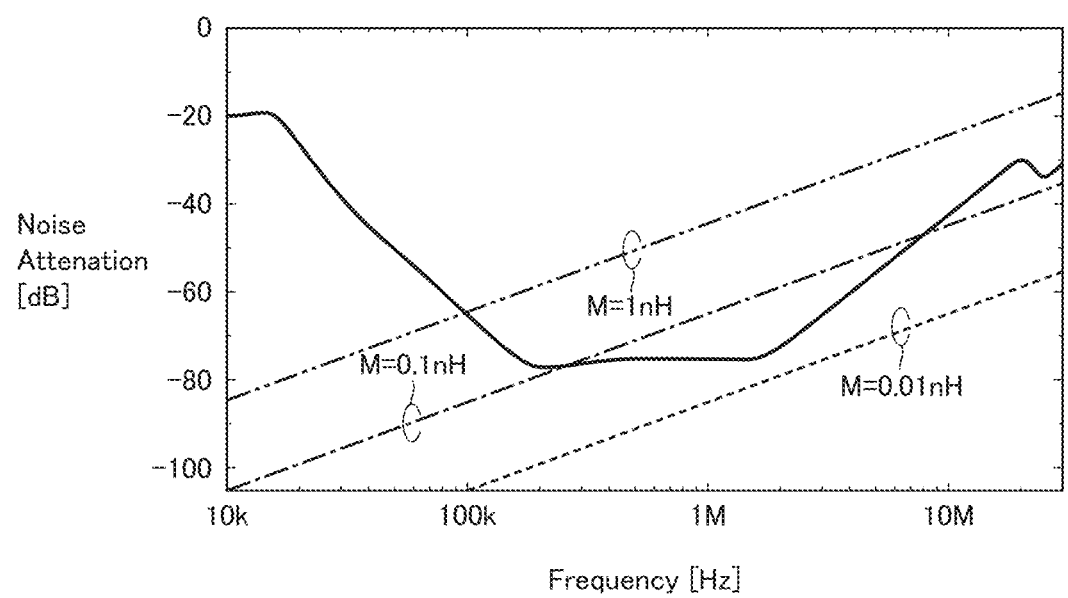
FIG. 31 is a diagram illustrating a result of comparison between the mutual inductance and characteristics of the noise filter to the common mode component.

FIG. 31 is a diagram illustrating a result of comparison between mutual inductance M (equation (3)) illustrated in the first embodiment and the characteristics of the noise filter to the common mode component illustrated in FIG. 28.

In the case of the noise filter illustrated in FIG. 28, when mutual inductance M is M=0.01 nH, the attenuation characteristic at the time of noise propagation due to magnetic coupling can be made smaller than the common mode component of the noise filter.

In equation (3) representing mutual inductance M, for example, by setting the distance between switching element 6 and magnetic filter 7 to 1 cm and arranging first wires 100 and 101 and second wire 104 to be separated by 0.5 m or more, M<0.01 nH can be satisfied. Conversely, in order to obtain M=0.01 nH, it is necessary to set the distance between switching element 6 and magnetic filter 7 to 1 cm or less and to separate the distance between first wires 100 and 101 and second wire 104 by 0.5 m or more.

Note that, when the two wires are not parallel to each other or when the two wires are twisted, mutual inductance M is smaller than M obtained from equation (3). However, in that case, assuming that an angle formed by the directions of the two wires with respect to a mutual inductance M0 at the closest distance between the two wires is θ, mutual inductance M can be calculated with M0·cos θ as an approximate value.

Third Embodiment

In a third embodiment, a design in consideration of the frequency characteristic of noise filter 5 will be described.

Noise filter 5 has frequency characteristic as in the measurement result of the conduction noise illustrated in FIG. 25. As illustrated in the first embodiment, a limit value determined by the standard of noise (for example, a limit value 32 for CISPR 14 in FIG. 25) has a frequency characteristic.

Here, a comparison between the frequency characteristic of noise filter 5 and the frequency characteristic of the limit value shows that attenuation characteristic A of noise filter 5 and attenuation characteristic B due to the spatial coupling by the mutual inductance and the parasitic capacitance between the first wire and the second wire described in the first embodiment satisfy B<A only in a frequency band exceeding the standard of noise.

For example, in FIG. 25, the noise in a frequency band of 7 MHz to 10 MHz is not easy to satisfy the standard, and noise filter 5 is designed such that the noise in the frequency band of 7 MHz to 10 MHz is actively reduced. That is, only for such a frequency band, the routing of first wires 100 and 101 and second wire 103 and the arrangement of magnetic filter 7 are determined such that attenuation characteristic B of noise due to the spatial coupling between first wires 100 and 101 and second wire 103 satisfies B<A comparing with attenuation characteristic A of noise filter 5.

As described above, not only a single frequency band (7 MHz to 10 MHz) but also a plurality of frequency bands (for example, both frequency bands of 7 MHz to 10 MHz and 500 kHz to 1 MHz) may be set.

Such a concept is desirably incorporated in design at a design stage before trial production. Therefore, a method of predicting a resonance frequency at the design stage before the trial production will be described below.

In order to predict the resonance frequency, it is necessary to recognize a frequency characteristic of switching element 6 serving as a noise source, a frequency characteristic of a propagation path of noise, and a reception port (a frequency characteristic of LISN for conduction noise and a frequency characteristic of antenna for radiation noise).

As illustrated in FIGS. 3 and 4 in the first embodiment, the frequency characteristic of switching element 6 serving as a noise source can be estimated at the design stage. In the reception port, since a regular measuring instrument such as LISN is used, the frequency characteristic can be recognized.

The problem is the frequency characteristic of the propagation path of noise. The noise basically propagates through the propagation path in the circuit diagram, but in addition, a parasitic component needs to be considered. For the parasitic component, for example, the impedance of the propagation path of noise can be calculated by using equivalent circuit calculation software (product name: Q3D, manufactured by ANYSYS, Inc.). The frequency characteristic of the propagation path of noise can be predicted using an electromagnetic field simulator (for example, product name: HFSS, manufactured by ANYSYS, Inc. product name: MWstudio, manufactured by Cell Signaling Technology, Inc., product name: FEMTET, manufactured by Murata Software Co., Ltd., or the like) instead of Q3D.

Then, by combining the frequency component of switching element 6, the frequency characteristic of the propagation path of noise, and the frequency characteristic at the reception port, the noise generated in the pseudo power supply circuit network (also called AMN: artificial mains network or LISN: line impedance stabilization network) as a measurement point can be estimated.

In calculation of the parasitic component, the self-inductance caused by a physical length of the wire, the housing, and the like can be estimated from a theoretical formula without using a simulator. Specifically, regarding a calculation method, similarly to the mutual inductance, an approximate value of the self-inductance can be calculated from Neumann's formula.

The parasitic capacitance between the housing and the wires on the board or the IC, the parasitic capacitance between the housing and the wires, the parasitic capacitance between the housing and the load, the capacitance of the capacitor of noise filter 5, and the capacitance of a measurement target as a combined capacitance can be calculated. As a result, the inductance component and the capacitance component are combined and connected in series or in parallel when viewed from switching element 6 as a noise source.

In a series connection, the impedance appears to approach 0 in a frequency band of series resonance. In a parallel connection, the impedance appears to approach infinity in a frequency band of parallel resonance. By combining a plurality of such series resonances and parallel resonances, the propagation path of noise has an impedance characteristic having resonances in a plurality of frequency bands. Consequently, by making the attenuation amount due to the spatial coupling in these frequency bands smaller than the attenuation amount of noise filter 5, it is possible to reduce the noise mixed in a location of noise measurement. Thus, the resonance frequency can be predicted at the design stage, and the frequency band to be reduced in the present embodiment can be recognized. As a result, it is possible to reduce restrictions on wires for reducing spatial coupling, and provide a power conversion device with a smaller size at a lower cost.

Fourth Embodiment

Figure 32:
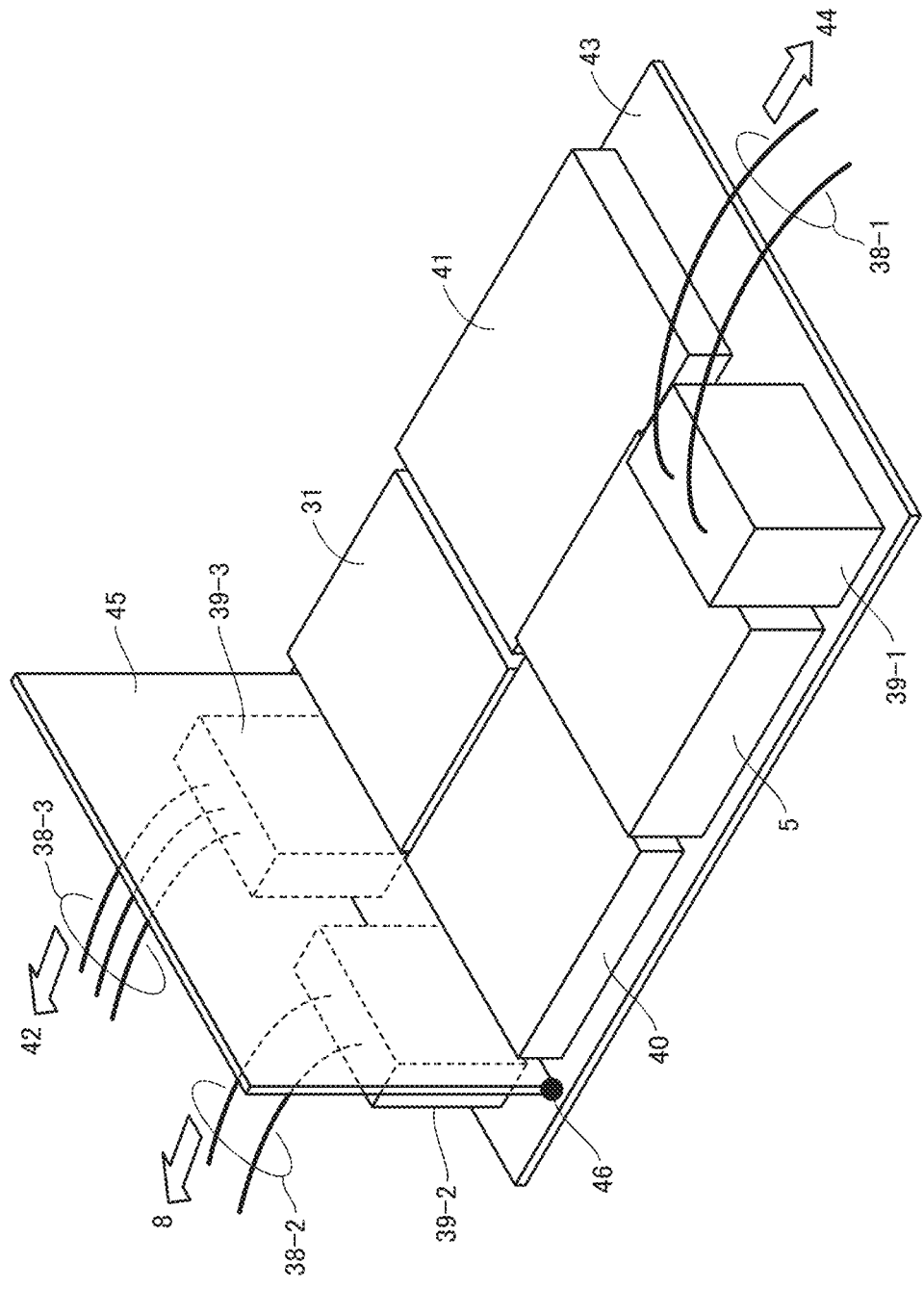
FIG. 32 is a perspective view illustrating one example of a power conversion device using a conductor plate according to a fourth embodiment.

FIG. 32 is a perspective view illustrating an example of a power conversion device using a conductor plate 45 according to a fourth embodiment. As illustrated in FIG. 32, converter circuit 40, inverter circuit 31, control circuit 41, connectors 39-1, 39-2, and 39-3, and conductor plate 45 are mounted on printed circuit board 43.

Connector 39-1 connects a cable 38-1 connected to a commercial power supply 44 (not shown) and printed circuit board 43. Cable 38-1 corresponds to first wires 100 and 101 illustrated in FIG. 1.

Noise filter 5 is connected to connector 39-1, and converter circuit 40 is connected to noise filter 5. Inverter circuit 31 converts DC power output from converter circuit 40 into AC power. Control circuit 41 controls converter circuit 40 and inverter circuit 31.

Connector 39-2 connects converter a cable 38-2 connected to reactor 8 (not shown) mounted outside of printed circuit board 43 and converter circuit 40. Cable 38-2 corresponds to second wire 103 illustrated in FIG. 1. Connector 39-3 connects a cable 38-3 connected to the load such as the rotary machine and inverter circuit 31.

Conductor plate 45 is connected to a ground on printed circuit board 43 or a metal housing (not shown) around printed circuit board 43. Alternatively, conductor plate 45 may be connected to the ground on printed circuit board 43 and connected to the metal housing using another cable.

Conductor plate 45 and the ground are desirably connected at multiple points. Conductor plate 45 and the ground can be connected using soldering, a screw, a spring, a bolt and a nut, crimping, a connector, or the like.

Note that conductor plate 45 is not limited to one plane plate, may be bent, or may include a plurality of plane plates. Conductor plate 45 does not need to be vertically attached to printed circuit board 43.

Conductor plate 45 is provided at least between switching element 6 and magnetic filter 7 including the ferrite core in second wire 103. In the example in FIG. 32, conductor plate 45 is provided close to second wire 103 connecting switching element 6 and magnetic filter 7, but conductor plate 45 may be connected close to first wires 100 and 101 connecting noise filter 5 and an external terminal.

A thickness of conductor plate 45 is not limited. In order to prevent a short circuit when conductor plate 45 is unintentionally detached due to vibration or the like, it is desirable to cover a surface of conductor plate 45 with a dielectric.

In the example in FIG. 32, conductor plate 45 is mounted between connectors 39-2 and 39-3 and converter circuit 40 and inverter circuit 31, but conductor plate 45 may be mounted between converter circuit 40 and inverter circuit 31 and noise filter 5 and control circuit 41.

In addition, as in the example of FIG. 32, connector 39-1 and connectors 39-2 and 39-3 are desirably attached to opposite corners on printed circuit board 43 or both ends of a long side of printed circuit board 43. As a result, a distance between cable 38-1 (corresponding to first wires 100 and 101 in FIG. 1) and cable 38-2 (corresponding to second wire 103 in FIG. 1) can be increased, and a space for arranging conductor plate 45 can be secured.

Fifth Embodiment

Figure 33:
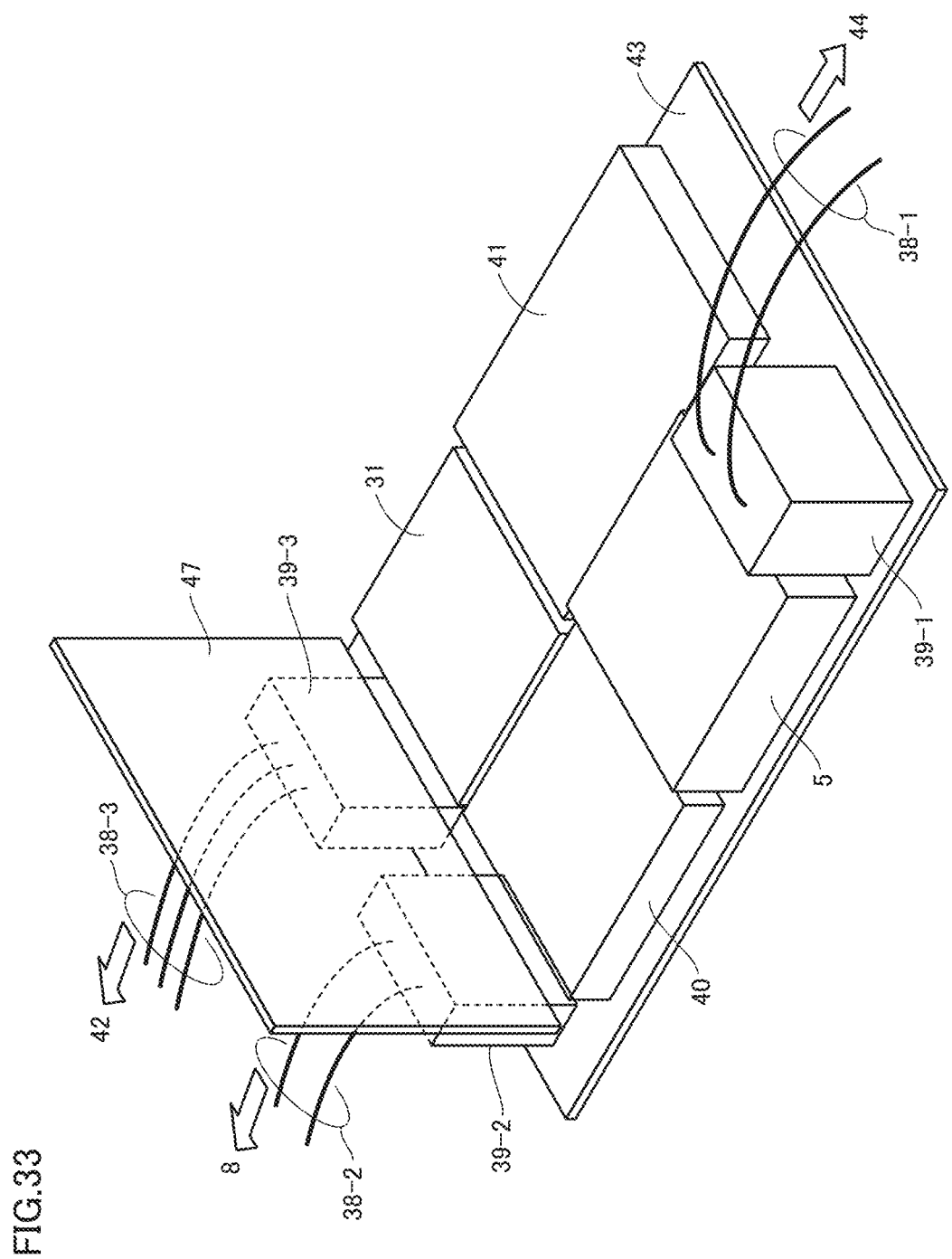
FIG. 33 is a perspective view illustrating one example of a power conversion device using a magnetic shield according to a fifth embodiment.

FIG. 33 is a perspective view illustrating one example of a power conversion device using a magnetic shield 47 according to a fifth embodiment. In the configuration example in FIG. 33, magnetic shield 47 made of a ferromagnetic body is used for conductor plate 45 according to the fourth embodiment illustrated in FIG. 32. Examples of the ferromagnetic body include alloys containing iron, cobalt, nickel, and the like.

In the example in FIG. 33, in a case where the ground or the metal housing on printed circuit board 43 is a ferromagnetic body, magnetic shield 47 may be attached to the ground or the metal housing (not shown) on printed circuit board 43 by utilizing a characteristic of magnetic shield 47 sticking to a magnet.

Magnetic shield 47 does not need to be electrically connected to the ground or the metal housing on printed circuit board 43. That is, magnetic shield 47 may be insulated from the ground and the metal housing (which means that the DC resistance is sufficiently large).

Figure 34:
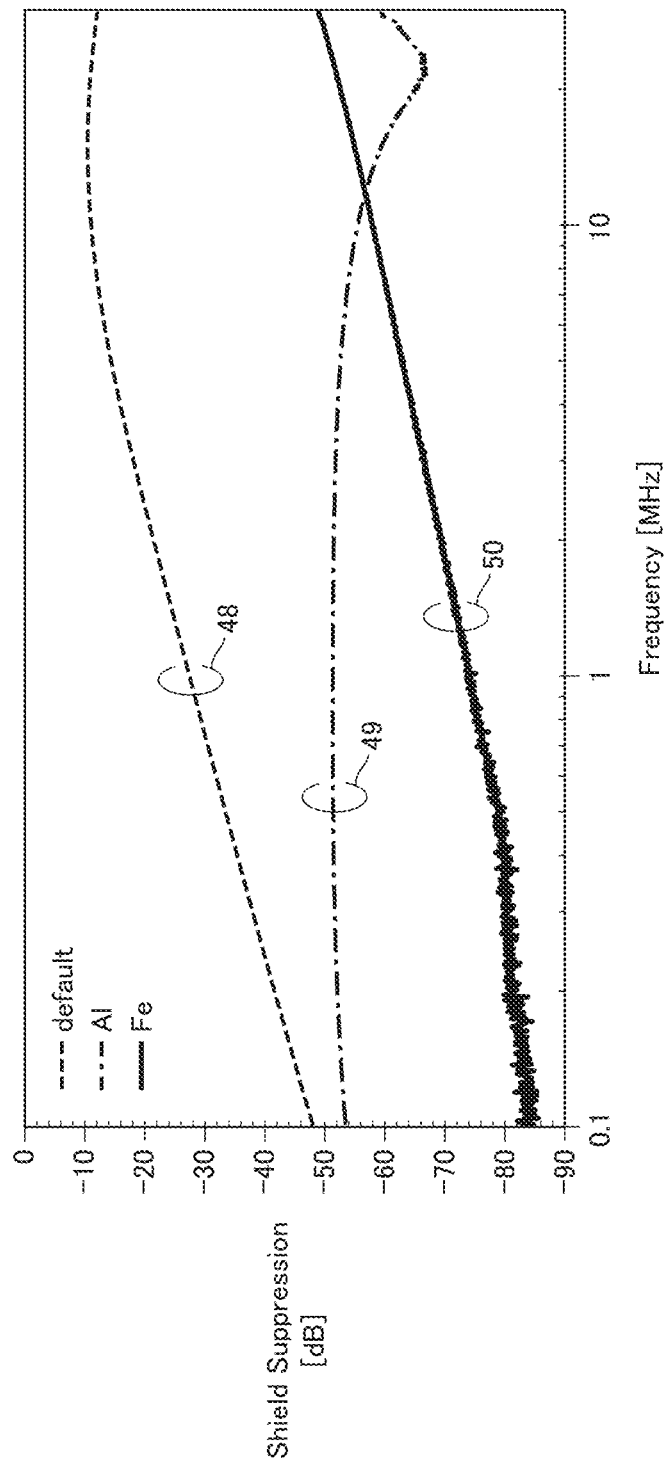
FIG. 34 is a diagram illustrating a measurement result of a shielding effect in a paramagnetic body and a ferromagnetic body.

FIG. 34 is a diagram illustrating a measurement result of a shielding effect in a paramagnetic body (copper, aluminum, or the like) and a ferromagnetic body. In the measurement in FIG. 34, the paramagnetic body and the ferromagnetic body are insulated from the ground, and two loop probes each wound ten times with a diameter of 50 mm are arranged with loop surfaces facing each other at a distance of 5 mm. In this state, the spatial coupling between the two loop probes is measured. In the measurement, the attenuation characteristic is measured in case (1) where the conductor plate is not disposed between the two loop probes, case (2) where the paramagnetic body is disposed between the two loop probes, and case (3) where the ferromagnetic body is disposed between the two loop probes. The paramagnetic body is an aluminum plate having a thickness of 1 mm. The ferromagnetic body is an iron plate having a thickness of 1 mm.

In a graph in FIG. 34, a waveform 48 indicates the attenuation characteristic in case (1) where no conductor plate is disposed, a waveform 49 indicates the attenuation characteristic in (2) case where a paramagnetic body is disposed, and a waveform 50 indicates the attenuation characteristic in (3) case where a ferromagnetic body is disposed.

As shown in FIG. 34, it can be seen that the paramagnetic body can reduce spatial coupling more than the ferromagnetic body in a frequency band lower than 10 MHz. In particular, in an IGBT or the like operated at a low speed, noise of 1 MHz or less often becomes a problem. In such a case, the spatial coupling between the wires can be reduced by using a shield sheet metal made of a paramagnetic body.

In the case of magnetic shield 47, the magnetic shield does not need to be connected to the ground, and it is therefore possible to reduce the possibility of a short circuit even if the magnetic shield is unintentionally detached due to vibration or the like. In addition, since a shield can be also provided for a power conversion device without a metal housing, magnetic coupling can be reduced. Furthermore, magnetic shield 47 can increase a degree of freedom of arrangement and reduce the number of steps of soldering or screw tightening, and thus enhance the attenuation characteristic of noise filter 5 at low cost.

As in the fourth embodiment, in the configuration example in FIG. 33, an attachment position of magnetic shield 47 may be close to second wire 103 or close to first wires 100 and 101.

Sixth Embodiment

In sixth and seventh embodiments, application examples of the power conversion device illustrated in the fourth embodiment will be described.

Figure 35:
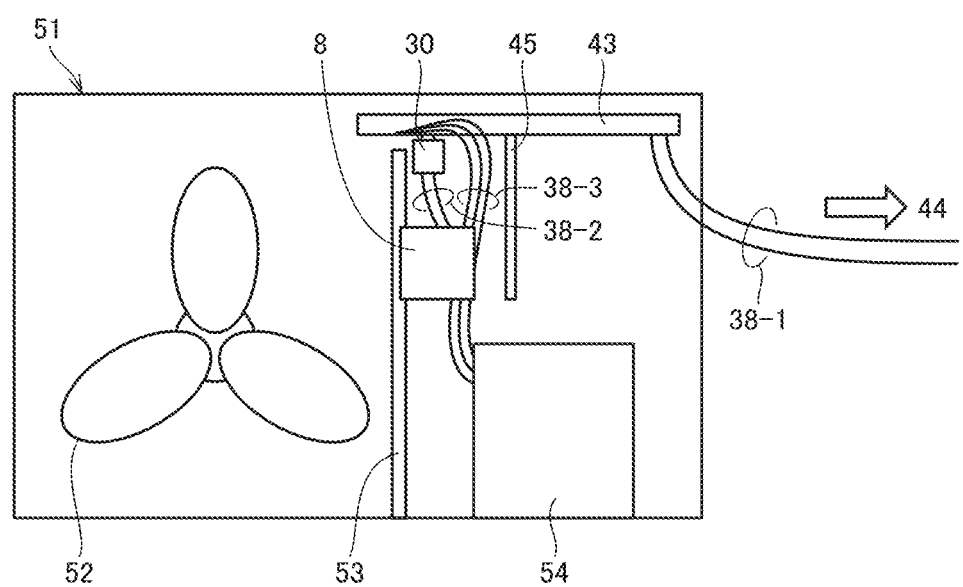
FIG. 35 is a schematic diagram illustrating a first configuration example of an air conditioner.

FIG. 35 is a schematic diagram illustrating a first configuration example of an air conditioner equipped with the power conversion device illustrated in FIG. 32.

As illustrated in FIG. 35, an outdoor unit 51 of the air conditioner includes a fan 52, a partition plate 53, a compressor 54, and printed circuit board 43. A space in which fan 52 is disposed and a space in which compressor 54 and printed circuit board 43 are disposed are separated by partition plate 53. Reactor 8 for a converter is attached to a conductor part of partition plate 53 for heat dissipation. An attachment position of reactor 8 is not limited to the conductor part.

Compressor 54 is disposed on a bottom surface of outdoor unit 51. Compressor 54 is connected to printed circuit board 43 via cable 38-3. Printed circuit board 43 is connected to reactor 8 via cable 38-2.

Ferrite core 30 is mounted as magnetic filter 7 on cable 38-2. Ferrite core 30 is disposed close to switching element 6 (not shown) on printed circuit board 43. Cable 38-3 is disposed apart from cable 38-2 in a depth direction in the drawing. Cable 38-1 is connected to commercial power supply 44 (not shown) of outdoor unit 51 from printed circuit board 43.

In the example in FIG. 35, in the measurement of the conduction noise, outdoor unit 51 is connected to the LISN, and then outdoor unit 51 is connected to the commercial power supply.

Conductor plate 45 (or magnetic shield 47) is provided between cable 38-2 and cable 38-1 and between cable 38-3 and cable 38-1. As a result, spatial coupling between cable 38-2 and cable 38-1 is reduced, and spatial coupling between cable 38-3 and cable 38-1 is reduced.

The configuration as illustrated in FIG. 35 can improve a noise attenuation characteristic of noise filter 5 attached to a tip of cable 38-1 as viewed from commercial power supply 44. In a general air conditioner, the distance between cable 38-1 and cable 38-2 is desirably greater than or equal to 0.3 m. A wire distance between switching element 6 and ferrite core 30 on printed circuit board 43 is desirably less than or equal to 3 cm, and in a case where conductor plate 45 (or magnetic shield 47) is provided, the wire distance is desirably less than or equal to 10 cm.

Seventh Embodiment

Figure 36:
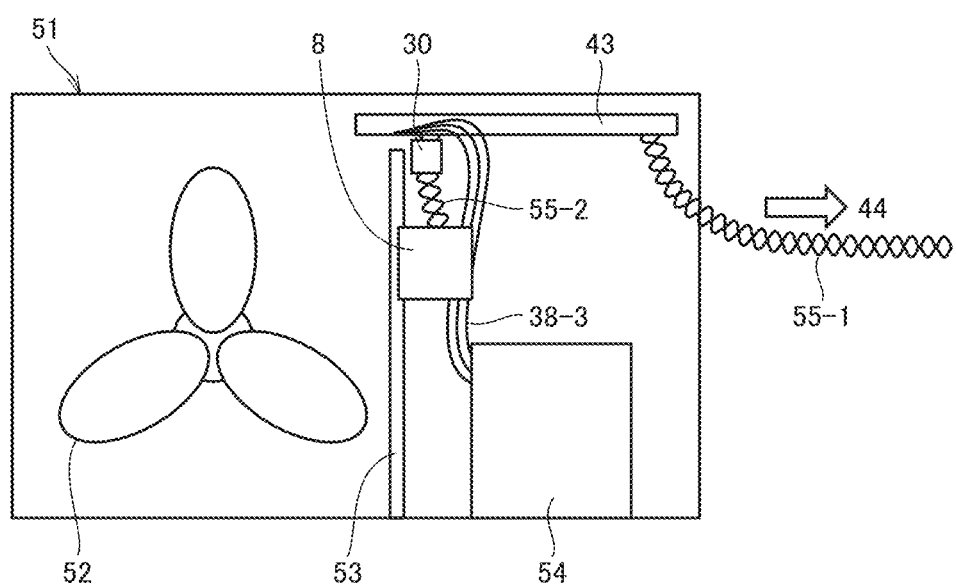
FIG. 36 is a schematic diagram illustrating a second configuration example of the air conditioner.

FIG. 36 is a schematic diagram illustrating a second configuration example of the air conditioner equipped with the power conversion device illustrated in FIG. 32.

As illustrated in FIG. 36, in the second configuration example, the space in which fan 52 is disposed and the space in which printed circuit board 43 and compressor 54 are disposed are separated by partition plate 53 as in the first configuration example illustrated in FIG. 35.

Reactor 8 is attached to partition plate 53. In the second configuration example, twisted cable 55-1 is used as a cable connecting printed circuit board 43 and commercial power supply 44. A twisted cable 55-2 is used as a cable connecting switching element 6 (not shown) on printed circuit board 43 and reactor 8.

On the other hand, cable 38-3 connecting the inverter circuit (not shown) on printed circuit board 43 and compressor 54 does not need to be a twisted cable. This is because the inverter is often slower than the converter using reactor 8 in general outdoor unit 51.

Printed circuit board 43 and each cable can be connected using a terminal block. In this case, the twisted cable may be used only for the cable disposed in outdoor unit 51. Usually, a twist pitch of the twisted cable is desirably from about 10 mm to 50 mm.

Such a configuration can reduce the normal mode component of noise mixed from twisted cable 55-2 to twisted cable 55-1. This is because noise is equally mixed into two or more conductive wires constituting each twisted cable, and the common mode component becomes dominant.

Switching element 6 normally operates in the normal mode. The common mode is generated when the wire or the component through which the normal mode current flows becomes an asymmetric propagation path. Therefore, the normal mode component is dominant as the noise component output from switching element 6. This configuration example can reduce spatial propagation of the normal mode component of noise by the twisted cable.

Eighth Embodiment

In an eighth embodiment, an attachment position of ferrite core 30 constituting magnetic filter 7 to the cable will be described.

Figure 37:
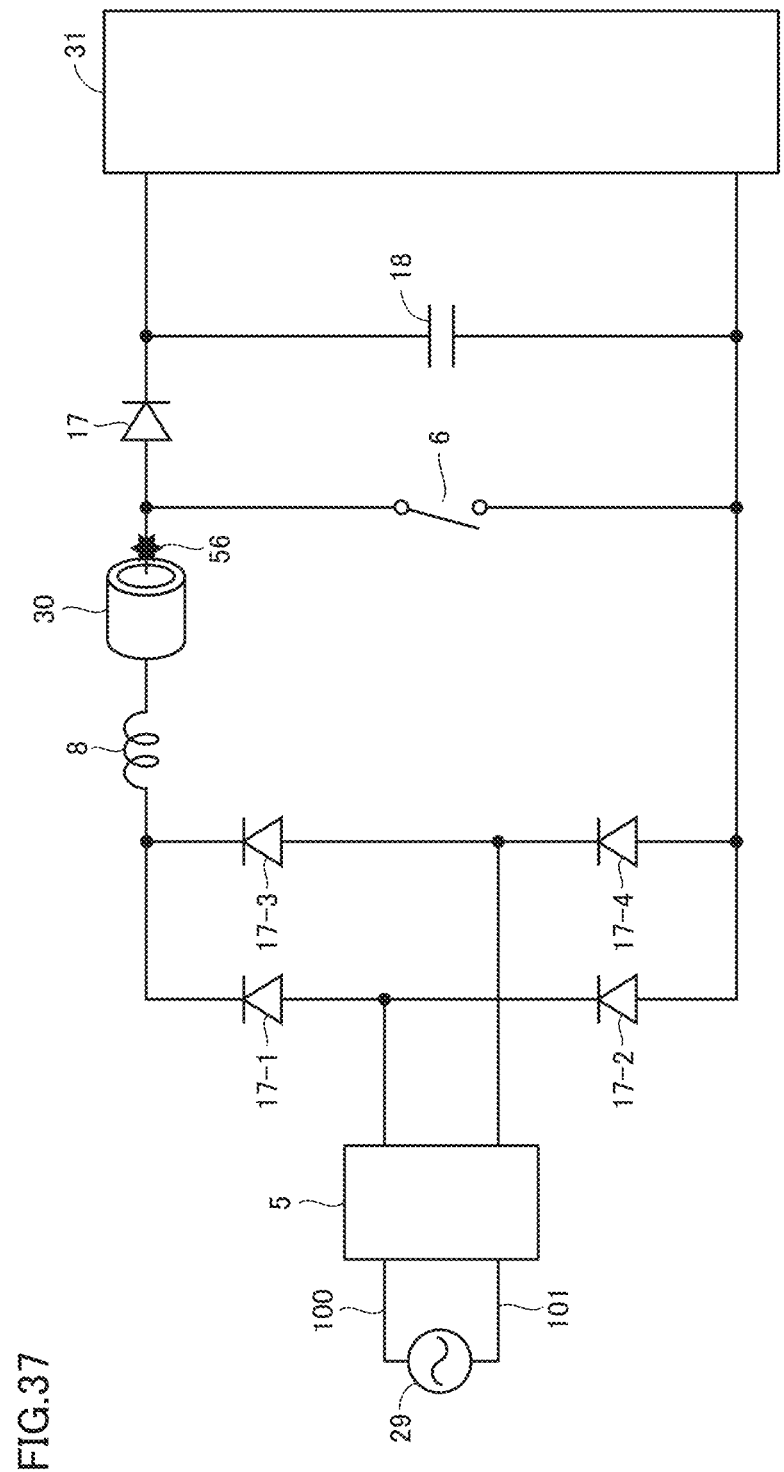
FIG. 37 is a circuit diagram for describing an attachment position of a ferrite core to a cable.

FIG. 37 is a circuit diagram for describing the attachment position of the ferrite core to the cable. In the eighth embodiment, a mark indicating the attachment position of ferrite core 30 is put on the cable. Specifically, in order to make the distance from switching element 6 as a noise source to ferrite core 30 constant, the cable is provided with a mark indicating an attachment position of ferrite core 30. In the example in FIG. 37, a mark 56 indicating a start position of winding ferrite core 30 is provided on the cable. By winding the cable twice or more around ferrite core 30, ferrite core 30 is less likely to move from the cables.

A detachable member such as a clip may be used as mark 56, and mark 56 may be removed after the cable is wound. A shape of mark 56 is also not limited. The cable may be wound around ferrite core 30 manually or by using a machine such as a robot arm.

Ninth Embodiment

In a ninth embodiment, a method of fixing the ferrite core will be described with reference to FIG. 38.

Figure 38:
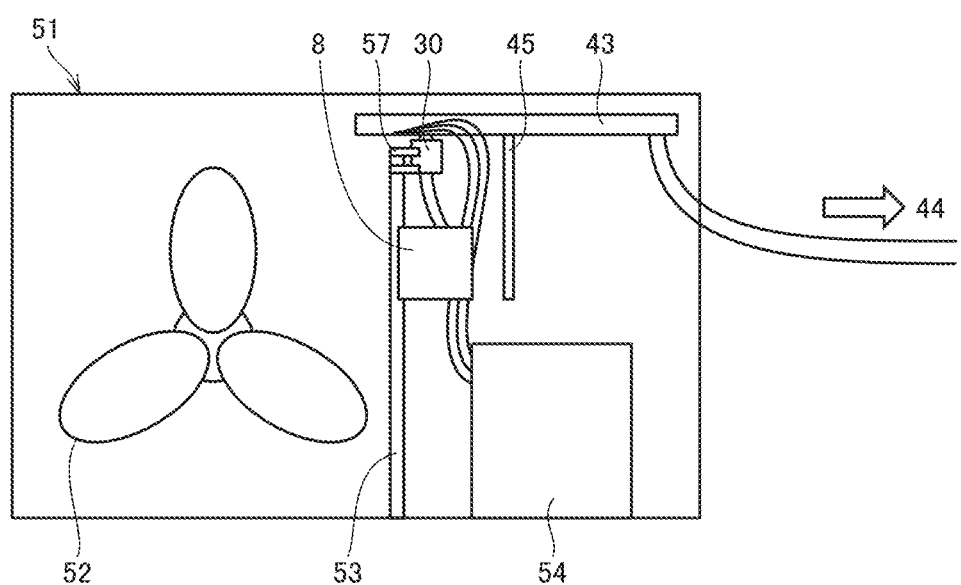
FIG. 38 is a schematic diagram illustrating a third configuration example of the air conditioner.

FIG. 38 is a schematic diagram illustrating a third configuration example of the air conditioner equipped with the power conversion device illustrated in FIG. 32. An outdoor unit of an air conditioner illustrated in FIG. 38 has the same basic configuration as the outdoor unit in the first configuration example of the air conditioner illustrated in FIG. 35.

As ferrite core 30 attached to the outdoor unit, a ferrite core of 5 g to 200 g can be used. By attaching heavy ferrite core 30 to the cable, ferrite core 30 is hung from printed circuit board 43 in some cases. In such a case, since a force is applied to printed circuit board 43 or the connector on printed circuit board 43, there is a possibility that a component is peeled off from printed circuit board 43 or the cable is detached from printed circuit board 43.

In order to avoid such a defect, ferrite core 30 is fixed. In the example in FIG. 38, a hole is formed in partition plate 53, and ferrite core 30 is fixed to partition plate 53 using a fixing member 57 that extends through the hole. Ferrite core 30 may be fixed to printed circuit board 43 instead of partition plate 53.

Fixing member 57 is desirably a dielectric in order to prevent a short circuit or the like, but may include any material. In the examples in FIGS. 35, 36, and 38, ferrite core 30 is hung from printed circuit board 43, but in another air conditioner or power conversion device, ferrite core 30 is disposed above and apart from printed circuit board 43 in some cases. In that case, it is possible to adopt a structure in which fixing member 57 is raised from the housing or printed circuit board 43 to fix ferrite core 30.

Tenth Embodiment

Figure 39:
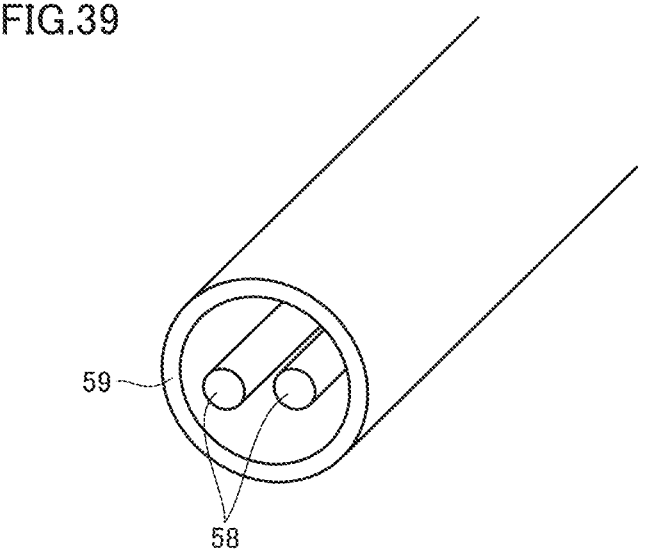
FIG. 39 is a sectional perspective view illustrating a configuration example of a cable according to a ninth embodiment.

FIG. 39 is a sectional perspective view illustrating a configuration example of the cable according to the ninth embodiment. The cable according to the ninth embodiment has a shield structure for reducing noise in the normal mode.

As illustrated in FIG. 39, when the power supply is a single-phase two-wire power supply, the cable has a structure in which outer peripheries of two core wires 58 are surrounded by an outer conductor 59 including a conductor. Core wires 58 are attached to the connector or the terminal block described in the above embodiment.

Outer conductor 59 has a first end connected to the metal housing of the power conversion device and a second end connected to the ground on the printed circuit board. The ground on the printed circuit board is at the reference potential, and is normally electrically connected to the metal housing.

The cable according to the ninth embodiment is applied to at least one of first wires 100 and 101 or second wire 103 in FIG. 1. As a result, it is possible to suppress the noise of the normal mode component and the common mode component from being transmitted and received via spatial propagation.

In a case where there are two or more core wires 58, a shield structure can be provided on twisted cables 55-1 and 55-2 by combining with the seventh embodiment illustrated in FIG. 36.

However, a double-sided board is often used for printed circuit board 43 according to the present embodiment, and sometimes in this case, the ground (reference potential) serving as a current return path is not a plane but a ground wire to which a Y capacitor is attached. In such a case, outer conductor 59 of the cable is connected to the ground wire. This structure, generally called a pigtail structure, degrades a shield characteristic of the cable. In this case, printed circuit board 43 is desirably a multilayer board. Alternatively, it is desirable that the outside of printed circuit board 43 is covered with a conductor (shield), and outer conductor 59 of the cable is connected to the shield.

However, as described in the first embodiment, since the standard of noise of each product is used, improvement of characteristics is also expected only by using a shielded cable in the pigtail structure, and thus a shield is desirably provided in the pigtail structure.

Eleventh Embodiment

Figure 40:
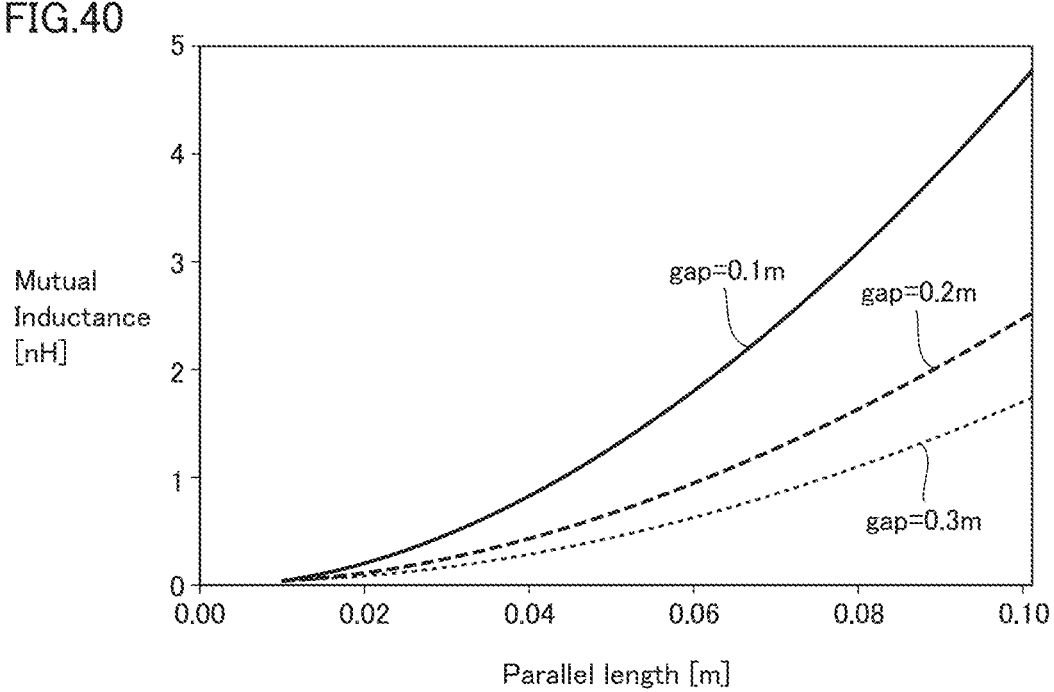
FIG. 40 is a diagram illustrating a relationship between a parallel running distance, a wire distance, and a mutual inductance between the two wires.

FIG. 40 is a diagram illustrating a result of calculating an approximate value of the mutual inductance based on the parallel running distance and the wire distance of the two wires by equation (3). In a graph in FIG. 40, a horizontal axis represents the parallel running distance of the two wires, and a vertical axis represents the mutual inductance.

As illustrated in FIG. 40, the mutual inductance increases as the parallel running distance increases regardless of a wire distance gap. On the other hand, the mutual inductance decreases as wire distance gap increases.

For example, it is assumed that the noise attenuation characteristic is set to about −20 dB to −60 dB at 1 MHz. In this case, the design described above is performed for each of the normal mode and the common mode. Depending on the size of the housing, the distance between the two wires cannot be increased in some cases. In such a case, the wire distance is also preferably about 0.2 m to 0.5 m. The parallel running distance is desirably less than or equal to 0.1 m.

When first wires 100 and 101 and second wire 103 illustrated in FIG. 1 are close to the same metal housing such that the two wires do not run in parallel, it is desirable that a distance between first wire 100 and the metal housing is greater than or equal to 0.1 m, and a distance between second wire 103 and the metal housing is greater than or equal to 0.1 m.

Twelfth Embodiment

In the above embodiment, the method of reducing the conduction noise has been described, but in accordance with the present embodiment, the radiation noise can also be reduced. For example, in the configuration examples of the air conditioner illustrated in FIGS. 35, 36, and 38, the outside of the air conditioner is covered with the metal housing. Conductor plate 45 (or magnetic shield 47) has a structure in which radiation noise is less likely to occur.

When noise is superimposed on a cable connected to the outside of the metal housing by spatial propagation, the noise is emitted to the outside of outdoor unit 51. In general, the standard of radiation noise is as significantly small as 0 dBµV at 120 kHz. Note that this standard corresponds to power when noise passing through a 120 kHz bandpass filter is measured using an EMI receiver. Since the radiation noise standard is significantly small, noise due to such secondary radiation sometimes becomes a problem. In air conditioners and other electronic devices, resin is often used as a part of a metal housing. Therefore, the shielding effect of the housing may not be obtained.

The present embodiment can make it difficult to mix noise into the cable connected to the external power supply, and thus makes it possible to reduce not only the noise terminal voltage but also the radiation noise.

Thirteenth Embodiment

Figure 41:
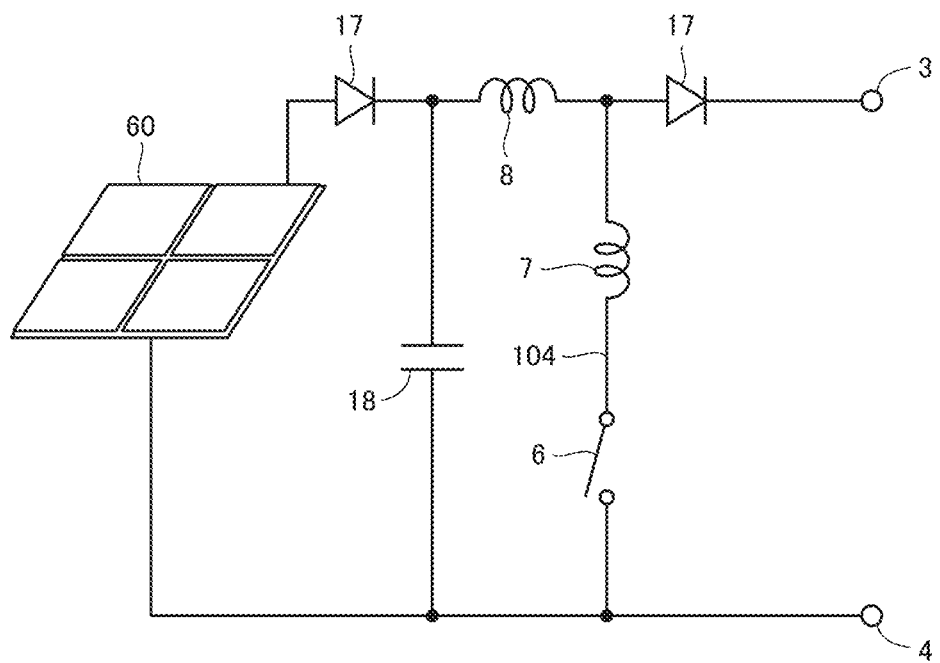
FIG. 41 is a diagram illustrating a configuration example in which a power conversion device is disposed between a solar panel and a storage battery.

FIG. 41 is a diagram illustrating a configuration example in which a power conversion device is disposed between a solar panel and a storage battery. In the configuration example in FIG. 41, in order to charge DC power generated by a solar panel 60 in the power storage device such as a storage battery, it is necessary to step up or step down a voltage value of the DC power to an appropriate voltage value. In many cases, in a system that exchanges power such as a smart grid, it is necessary to output the power after conversion into an alternating current. It is therefore necessary to convert DC power into AC power by an inverter (DC-AC converter).

As described above, the power conversion device according to the present embodiment can be applied to not only an air conditioner and a solar power generator but also a power conversion device and all power devices having a noise filter.

The embodiments disclosed herein are also planned to be implemented in appropriate combination within a range not technically contradictory. It should be understood that the embodiments disclosed herein are illustrative in all respects and not restrictive. The scope of the present disclosure is defined not by the above description of the embodiments but by the claims, and is intended to include meanings equivalent to the claims and all modifications within the scope.

REFERENCE SIGNS LIST 1 to 4: external electrode, 5: noise filter, 6: switching element, 7: magnetic filter, 8: reactor, 9, 10: input terminal, 11, 12: output terminal, 13: interline capacitor, 14: ground capacitor, 15: common mode choke coil, 16: normal mode choke coil, 17: diode, 18: smoothing capacitor, 19: transformer, 20: bridge rectifier circuit, 21: external electrode, 30: ferrite core, 31: inverter circuit, 38: cable, 39: connector, 40: converter circuit, 41: control circuit, 42: load, 43: printed circuit board, 44: commercial power supply, 45: conductor plate, 47: magnetic shield, 51: outdoor unit, 57: fixing member, 58: core wire, 59: outer conductor, 100, 101: first wire, 103 to 105, 109 to 112, 116 to 119: second wire, 106 to 108, 113 to 115: third wire

The invention claimed is:
1. A power conversion device comprising:
at least one external electrode;
a switch;

a noise filter connected between the at least one external electrode and the switch;

at least one first wire to connect the at least one external electrode and the noise filter;

a second wire to connect the noise filter and the switch; and a magnetic filter attached to the second wire, wherein an attenuation characteristic A [dB] and an attenuation characteristic B [dB] satisfy a relationship of B<A, where A is an attenuation characteristic of the noise filter and B is an attenuation characteristic due to spatial coupling between the at least one first wire and the second wire that is located between the switch and the magnetic filter.

2. The power conversion device according to claim 1, further comprising a reactor connected between the at least one external electrode and the switch, wherein the noise filter is connected between the at least one external electrode and the reactor, the second wire is connected between the reactor and the switch, and the attenuation characteristic B includes an attenuation characteristic due to spatial coupling between the at least one first wire and the second wire that is located between the magnetic filter and the switch.

3. The power conversion device according to claim 1, wherein the attenuation characteristic A is an attenuation characteristic of the noise filter for a common mode noise.

4. The power conversion device according to claim 1, wherein the attenuation characteristic A includes an attenuation characteristic of the noise filter at at least one frequency, and the attenuation characteristic B includes an attenuation characteristic due to the spatial coupling at the at least one frequency.

5. The power conversion device according to claim 1, wherein the at least one external electrode includes a plurality of external electrodes, the at least one first wire includes a plurality of first wires, and the attenuation characteristic B corresponds to a maximum value of an attenuation characteristic due to spatial coupling between each of the plurality of first wires and the second wire that is located between the switch and the magnetic filter.

6. The power conversion device according to claim 1, further comprising a magnetic shield disposed between the at least one first wire and the second wire that is located between the switch and the magnetic filter.

7. The power conversion device according to claim 1, further comprising:

a first metal housing; and a conductor plate connected to the at least one first metal housing and disposed between the first wire and the second wire that is located between the switch and the magnetic filter.

8. The power conversion device according to claim 1, wherein the magnetic filter includes a ferrite core.

9. The power conversion device according to claim 1, further comprising:

an input terminal;

an output terminal;

a printed circuit board on which at least the switch, the noise filter, the input terminal, and the output terminal are mounted;

a first connector connected to the input terminal on the printed circuit board; and a second connector connected to the output terminal on the printed circuit board, wherein the first connector and the second connector are disposed at opposite corners of the printed circuit board or at both ends of a long side of the printed circuit board.

10. The power conversion device according to claim 1, wherein at least one of the at least one first wire or the second wire that is located between the switch and the magnetic filter includes a twisted cable.

11. The power conversion device according to claim 1, wherein at least one of the at least one first wire or the second wire includes a shielded cable.

12. The power conversion device according to claim 8, further comprising:

a printed circuit board on which at least the switch and the noise filter are mounted;

a housing to accommodate at least the printed circuit board; and a fixing structure to fix the ferrite core to the printed circuit board or the housing.

13. The power conversion device according to claim 8, wherein the second wire is provided with a mark that indicates an attachment position of the ferrite core.

14. The power conversion device according to claim 2, wherein a part of the second wire includes a metal wire constituting the reactor.

15. The power conversion device according to claim 1, wherein a part of the second wire includes a metal wire constituting the switch.

16. The power conversion device according to claim 1, wherein a wire distance between the switch and the magnetic filter is less than or equal to 3 cm in a case where a distance between the at least one first wire and the second wire is greater than or equal to 0.3 m.

17. The power conversion device according to claim 1 wherein a distance between the at least one first wire and the second wire is greater than or equal to 0.2 m, and a parallel running distance of the at least one first wire and the second wire is less than or equal to 0.1 m.

18. The power conversion device according to claim 1 wherein a distance between the at least one first wire and a second metal housing is greater than or equal to 0.1 m and a distance between the second wire and the second metal housing is greater than or equal to 0.1 m in a case where the second metal housing is provided around the at least one first wire and the second wire.

19. An air conditioner comprising:

the power conversion device according to claim 1;

a fan; and a compressor, wherein the at least one first wire and the second wire that is located between the switch and the magnetic filter are apart from each other at a distance of greater than or equal to 0.1 m.

20. The air conditioner according to claim 19, wherein the attenuation characteristic A and the attenuation characteristic B satisfy a relationship of B+6 [dB]<A [dB].

* * * * *